(12) United States Patent  
Toyama et al.

(10) Patent No.: US 7,383,508 B2
(45) Date of Patent: Jun. 3, 2008

(54) COMPUTER USER INTERFACE FOR INTERACTING WITH VIDEO CLIPLETS GENERATED FROM DIGITAL VIDEO

(75) Inventors: Kentaro Toyama, Redmond, WA (US); Steven M. Drucker, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 505 days.

(21) Appl. No.: 10/176,827

(22) Filed: Jun. 19, 2002

(65) Prior Publication Data

US 2003/0234805 A1 Dec. 25, 2003

(51) Int. Cl.
*G06F 3/048* (2006.01)
*G06F 3/01* (2006.01)
*G06F 3/14* (2006.01)

(52) U.S. Cl. .................. 715/723; 715/720; 715/725
(58) Field of Classification Search ............. 715/721, 715/719, 716, 720, 723, 725
See application file for complete search history.

(56) References Cited

U.S. PATENT DOCUMENTS

| 5,191,645 | A |  | 3/1993 | Carlucci et al. |
| 5,404,316 | A |  | 4/1995 | Klingler et al. |
| 5,635,982 | A | * | 6/1997 | Zhang et al. ........... 348/231.99 |
| 5,706,097 | A |  | 1/1998 | Schelling et al. |
| 6,807,306 | B1 | * | 10/2004 | Girgensohn et al. ........ 382/225 |
| 6,983,424 | B1 |  | 1/2006 | Dutta |

| 2001/0012023 | A1 | 8/2001 | Kobayashi et al. |

FOREIGN PATENT DOCUMENTS

EP 0915469 A2 11/1998
WO WO9308664 4/1993

OTHER PUBLICATIONS

J. Ascenso, P. Correia and F. Pereira, *A Video Segmentation Toolbox with Support for User Interaction*, ConfTel 2001, Figueira da Foz, Portugal, Apr. 2001.
J. Boreczky, A. Girgensohn, G. Golovchinsky, and S. Uchihashi, *An Interactive Comic Book Presentation for Exploring Video.* In CHI 2000, pp. 185-192, 2000.

(Continued)

*Primary Examiner*—John Cabeca
*Assistant Examiner*—Namitha Pillai
(74) *Attorney, Agent, or Firm*—Lyon & Harr, L.L.P.; Craig S. Fischer

(57) ABSTRACT

The present invention includes a computer user interface system and a method for displaying short segments of video each representing a single theme or event (called video cliplets or "cliplets"). The computer user interface displays the cliplets and information and properties of each of the cliplets. Through the computer user interface of the invention, a user can quickly and easily determine the contents and interesting portions of the video. The cliplet user interface method includes displaying a plurality of cliplets in a two-dimensional arrangement along with cliplet information. The cliplet user interface system includes a plurality of keyframe windows for displaying cliplets and a keyframe within each keyframe window representing a cliplet therein. Moreover, the cliplet user interface system includes a cliplet property presentation area for displaying a cliplet interest rating. The cliplet interest rating indicates the amount of interesting content within the cliplet for a particular cliplet property.

20 Claims, 16 Drawing Sheets

OTHER PUBLICATIONS

J. Boreczky and L.D. Wilcox, A Hidden Markov Model Framework for Video Segmentation Using Audio and Image Features, In *Proceedings of the International Conference on Acoustics, Speech and Signal Processing* (Seattle, WA), vol. 6, 1998, pp. 3741-3744.

P. Chiu, A. Girgensohn, W. Polak, E. Rieffel and L. Wilcox, A Genetic Algorithm for Video Segmentation and Summarization, In *Proceedings of ICME (IEEE Multimedia)*, 2000.

A. Girgensohn, S. Bly, F. Shipman, J. Boreczky and L. Wilcox, Home Video Editing Made Easy-Balance Automation and User Control, In *Human-Computer Interaction INTERACT '01*, IOS Press, pp. 464-471, 2001.

A. Girgensohn and J. Boreczky, Time-Constrained Keyframe Selection Technique, In *IEEE Multimedia Systems 1996*, IEEE Computer Society, vol. 1, pp. 756-761, 1999.

A Girgensohn, J. Boreczky, P. Chiu, J. Doherty, J. Foote, G. Golovchinsky, S. Uchihasi and L. Wilcox, A Semi-Automatic Approach to Home Video Editing, In *UIST 2000 Proceedings*, ACM Press, pp. 81-89.

A. Girgensohn and J. Foote, Video Classification Using Transform Coefficients, In *Proceedings of the International Conference on Acoustics, Speech and Signal Processing* (Phoenix, AZ), vol. 6, pp. 3045-3048, 1999.

A. Hauptmann and M.A. Smith, *Text, Speech, and Vission for Video Segmentation: The Informedia™ Project*, AAAI Fall Symposium on Computational Models for Integrating Language and Vision, Boston, MA, Nov. 10-12, 1995.

H. Jiang, T. Lin and H. Zhang, *Video Segmentation with the Support of Audio Segmentation and Classification*, Microsoft Research, China, 1999.

H. Lee and A.F. Smeaton, *Designing the User Interface for the Fischlar Digital Video Library*, Journal of Digital Information, vol. 2, issue 4, May 21, 2002.

Z.N. Li and J. Wei, Spatio-Temporal Joint Probability Images for Video Segmentation, In *Proceedings of the IEEE International Conference on Image Processing* (ICIP 2000), vol. II, pp. 295-298, 2000.

E. Sifakis, I. Grinias and G. Tziritas, Video Segmentation Using Fast Marching and Region Growing Algorithms, In *EURASIP Journal on Applied Signal Processing*, 2002:4, pp. 379-388, 2002.

C.M. Taskiran, A. Amir, D. Ponceleon and E.J. Delp, Automated Video Summarization Using Speech Transcripts, In *Proceedings of the SPIE Conference on Storage and Retrieval for Media Databases 2002*, Jan. 20-25, San Jose, CA.

C.M. Taskiran and E.J. Delp, A Study on the Distribution of Shot Lengths for Video Analysis, In *Proceedings of the SPIE Conference on Storage and Retrieval for Media Databases 2002*, Jan. 20-25, 2002, San Jose, CA.

S. Uchihashi and J. Foote, Summarizing Video Using a Shot Importance Measure and a Frame-Packing Algorithm, In *Proceedings of the International Conference on Acoustics, Speech and Signal Processing* (Phoenix, AZ), vol. 6, pp. 3041-3044, 1999.

S. Uchihashi, J. Foote, A. Girgensohn and J. Boreczky, Video Magna: Generating Semantically Meaningful Video Summaries, In *Proceedings ACM Multimedia*, (Orlando, FL), ACM Press, pp. 383-392, 1999.

L. Wilcox and J. Boreczky, Annotation and Segmentation for Multimedia Indexing and Retrieval, In *Proceedings of the Thirty-First Annual Hawaii International Conference on System Sciences*, (Wailea, Hawaii), vol. II, pp. 259-267, Jan. 1998.

C. Wills, Video Segmentation for Post-Production, In *Proceedings of the SPIE Conference on Storage and Retrieval for Media Databases 2002*, Jan. 20-25, 2002, San Jose, CA, vol. 4676, pp. 158-167.

Co-pending U.S. Appl. No. 10/176,828, "System and Method for Automatically Generating Video Cliplets from Digital Video", filed Jun. 19, 2002.

Co-pending U.S. Appl. No. 10/177,460, "System and Method for Automatically Authoring Video Compositions Using Video Cliplets", filed Jun. 19, 2002.

Co-pending U.S. Appl. No. 10/177,882, "Computer User Interface for Viewing Video Compositions Generated from a Video Composition Authoring System Using Video Cliplets", filed Jun. 19, 2002.

Wang, Y., Zhu Liu, J.-C. Huang, Multimedia content analysis—Using both audio and visual clues, *Signal Processing Magazine, IEEE*, 2002, vol. 17, No. 6, pp. 12-36.

Ren, W., M. Sharma and S. Singh, Automated video segmentation, *Proc. 3rd Int'l Conf. on Information, Communications & Signal Processing, ICICS 2001*,Singapore, Oct. 2001.

European Search Report, Application No. EP03012634.6, completed May 23, 2006, received May 31, 2006.

\* cited by examiner

COMPUTER USER INTERFACE FOR INTERACTING WITH VIDEO CLIPLETS GENERATED FROM DIGITAL VIDEO

TECHNICAL FIELD

The present invention relates in general to a computer user interface and more particularly to a system and a method for displaying short segments of video (or video "cliplets") and information and properties about the cliplets using a computer user interface.

BACKGROUND OF THE INVENTION

Video cameras (or camcorders) are devices that are popular with amateur videographers. Video cameras may be a digital camera, which stores digital video on a memory device, or an analog video camera, which stores video footage on magnetic videotape. Video footage captured by an analog video camera may be converted into a digitized format using well-known techniques. Digital video may be processed using a software running on a computing devices (such as personal computers) to edit and manipulate the data captured by video cameras.

The traditional home digital video paradigm expects a user to shoot good video, perform tedious video editing, and then output a single large video containing the edited movie. This paradigm, however, suffers from several problems. One problem is that good video that is enjoyable to watch is difficult to photograph or shoot. Home digital video is overwhelmingly shot by amateur videographers. These amateurs generally have little training in shooting video and consequently frequently make poor decisions about what and how to shoot video. The result is video footage that is difficult to watch.

Another problem is that raw video footage, even when professionally photographed, is difficult and tedious to edit. Professional editors with professional training and using high-end editing tools can take hour to edit raw video into a final version that is just minutes in duration. Moreover, most raw video footage is boring and poring over hours of raw video is quite a tedious task, especially for an amateur.

Yet another problem is that current video editing software for amateur use is modeled after professional editing systems. This tends to make the software difficult for the average consumer to use. User interfaces of current video editing software typically provide a user with one view of the raw video footage. These user interface provide a user with a timeline along side the footage to give the user temporal orientation. The timeline may include several different "tracks", such as a video 1 track, a video 2 track, an audio 1 track, and so forth. The user interface includes controls similar to a VCR, such as play, fast-forward and rewind buttons. Using these buttons, a user browses the video footage by moving back and forth across the footage using the controls. This process of browsing the video footage to find a particular section is called "scrubbing".

Having only one view of raw video footage can make it difficult to determine the contents contained in the footage. One view at a time of an entire video does not provide enough information to a user to determine what is contained on the video and whether the content is interesting. Most videos are at least two hours long and contain a multitude of events. Scrubbing through the raw footage using software giving only a single view of the footage can be quite tedious.

Once a user finds interesting video footage, beginning and ending cuts are placed on the timeline. Between these two cuts is the video footage that the user wants to keep. This process of placing cuts on the video footage may be repeated for other portions of the video footage. This editing process of scrubbing the video to determine the location of cuts in the video footage is a tedious, repetitive and time-consuming task and must be performed manually. Thus, for the average consumer the editing process of videos is a difficult and burdensome task.

Accordingly, there exists a need for a user interface that displays a plurality of views of a video, provides a multitude of information about the video, and presents the plurality of views and corresponding information to a user in an informative, compact and easy to user manner.

SUMMARY OF THE INVENTION

The invention disclosed herein includes a computer user interface system and a method for displaying short segments of video each representing a single event or theme (called video cliplets or "cliplets"). The cliplets are generated from longer units of video (or a source video) by automatically determining editing points and extracting the cliplets from the source video using the editing points. The computer user interface displays the cliplets and information and properties of each of the cliplets. In this manner, a user can quickly and easily determine information about the source video, such as the subject matter contained on the video and the interesting portions.

The cliplet user interface system and method of the invention overcomes the problems of the traditional editing software by using cliplets to divide a larger source video into smaller segments. Rather than displaying only one or two views of the source video, the cliplet user interface displays a multitude of views of the source video by presenting a plurality of cliplets to a user. In addition, information about each cliplet is displayed to the user to make editing with cliplets even easier for the user. The cliplets are pre-cut from the source video, eliminating the need for the user to manually scrub the source video to determine good editing points. Moreover, editing of the source video occurs using the cliplets rather than long, tedious stretches of video.

In general, the cliplet user interface system and method provides a user with a plurality of cliplets in a two-dimensional arrangement. The plurality of cliplets are displayed each in their own window. The two-dimensional arrangement means that each of the plurality of cliplets is a single, independent entity and that there are no piles or stacks of cliplets. In addition to displaying the cliplets, cliplet properties also are displayed to provide a user with information about a corresponding cliplet. The cliplet properties include cliplet interest ratings that provide information about the content of the cliplet. Cliplet interest ratings can be represented by interest bars. The higher the interest bar the higher interesting content in the corresponding area. For example, if an audio interest bar is high for a certain cliplet it means that that cliplet has interesting audio content. Functionality such as scrolling, drag and drop, and merging functionality is provided for each of the cliplets. Using a pointing device, a user can play a cliplet in its own window.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

Figure 1:
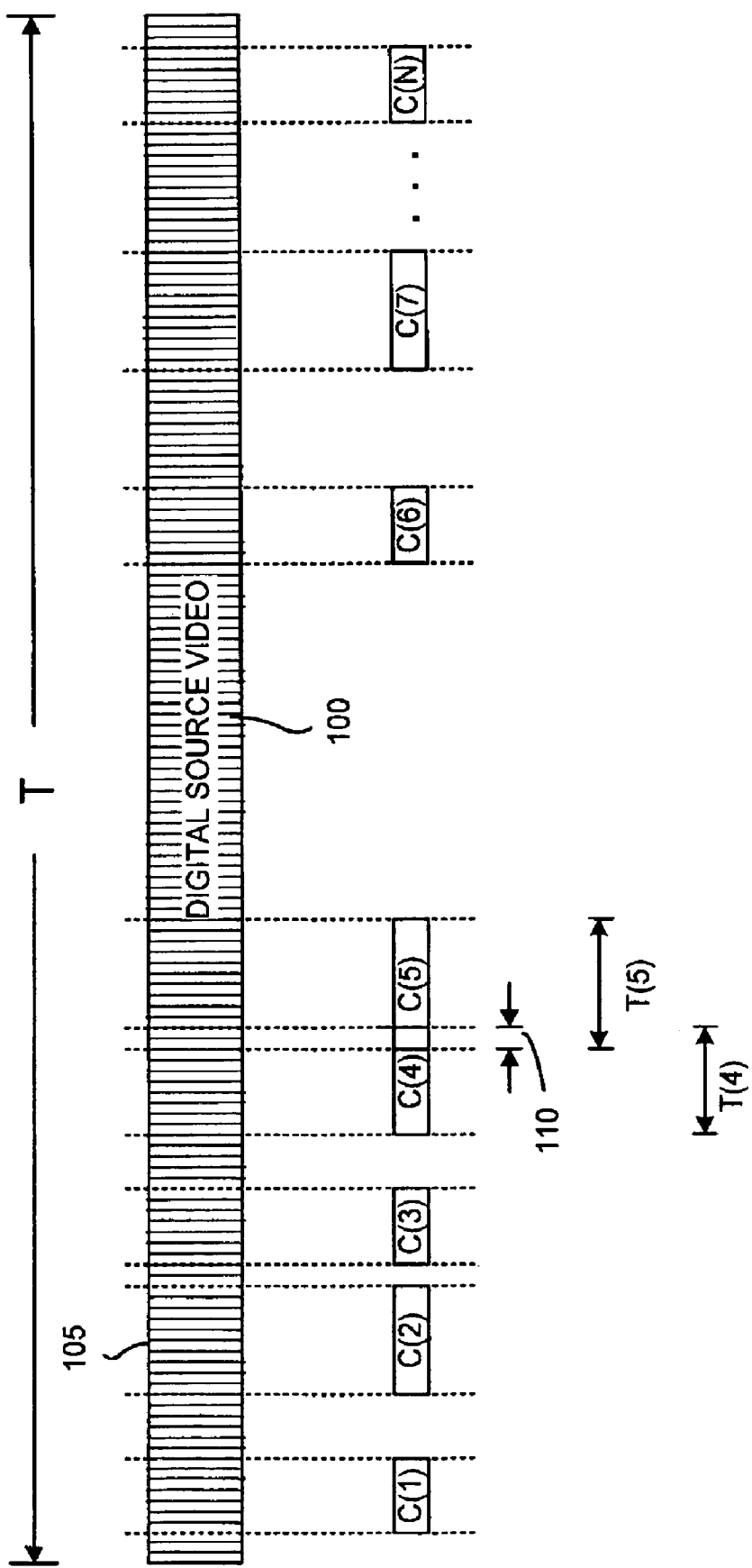
FIG. 1 is a diagram illustrating the concept of the video cliplet in relation to a longer unit of video (a source video) and video frames.

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction to Video Cliplets

The computer user interface described herein includes a system and a method for displaying short segments of video (or video "cliplets") generated from a longer digital source video. Additionally, information and properties about the cliplets are displayed. In general, a video cliplet (or "cliplet") is an ultra-short segment of digital video created by cutting or slicing up a larger source video. The duration of the cliplet is an upper bound value that is determined manually by a user or automatically by a cliplet generation system and method. Typically, a video cliplet is approximately between seven and ten seconds in duration, but may be 5 seconds or shorter and as long as 30 seconds.

The goal of cliplet generation is to extract meaningful, short segments of video with only secondary regard for what are traditionally considered shot boundaries. Cliplets, therefore, can be based on other non-traditional cues such as audio cues (such as trying to detect sound bites) or video cues (such as trying to zoomed-in close ups). In addition, cliplets can overlap in time. This means that two different cliplets can contain the same video frames. Cliplets do not necessarily have to cover all of the entire source video. In other words, a boring and uninteresting section of the source video may be excluded altogether. All of this achieves the goal of having each cliplet be a semantically meaningful portion of video.

The following features distinguish a cliplet from other segments of video. First, prior to generation a duration constraint (i.e., a constraint on the cliplet length) is determined. The upper bound value sets a maximum duration for the cliplet. This upper bound value is not a "hard" boundary, however, and as explained below may be violated if other constraints take priority. Second, a cliplet does not necessarily need to be an independent video. The cliplet could be a pair of starting and stopping points (or editing points) denoting where to cut a larger source video for extracting the cliplet. Third, a cliplet is a semantically meaningful portion of video containing what a viewer might consider a single short event (such as a sound bite). The cliplet has a single theme or a common thread that makes the cliplet stand apart from the source video.

The relatively short length of a cliplet as compared to the longer source video allows the cliplet to be manipulated more like a digital photograph than a digital video. Video cliplets allow a shift from away from large videos that are burdensome to manipulate and store. Cliplets focus on short, exciting segments of video rather than on long, dull videos. Consumers tend to become bored watching hours of a long video that contains only a few interesting scenes. Rather than constantly using the fast-forward button to fast forward through uninteresting sections of the video, cliplets allow a user to extract the interesting scenes, the "heart" of the video.

Cliplets also are easier than large videos to manipulate and store. User resistance to uploading and sharing videos due to their large size is minimized by generating cliplets from the source video. Cliplets avoid multi-megabyte or multi-gigabyte videos. By definition, cliplets are smaller than large videos. Thus, operations that are impractical on large videos due to limited memory, storage, processing power, bandwidth or human attention can be performed with ease on cliplets. Because of its smaller size, a cliplet has a shorter upload time, makes fewer demands on bandwidth, requires less disk space and generally is easier to manage than large videos.

Most operations that apply to a digital photograph have an analog for video cliplets. Because of its small size, a video cliplet can be browsed using thumbnails, organized by time stamp and gross pixel statistics, cut and pasted into documents, and sent easily over e-mail. In theory, most of these operations already exist for videos but in practice the capabilities are rarely used by consumers because typical home videos are too large, too long and too boring. Image processing and computer vision algorithms that are unable to process large videos can be used easily on cliplets. Technologies such as image stabilization, color correction, panorama creation, three-dimensional depth understanding, face recognition, person tracking can be used on cliplet in real time.

FIG. 1 is a diagram illustrating the concept of the video cliplet in relation to a longer unit of video (a source video) and video frames. A digital source video 100 of length or duration T contains a plurality of video frames 105. As shown in FIG. 1, the digital source video 100 is divided into a plurality of cliplets C(1) to C(N). These cliplets can be of varying lengths.

As explained above, each of these cliplets, C(1) to C(N), is a semantically meaningful portion of the digital source video 100. In some cases, two or more cliplets can overlap in time and thus share the same video frames. Referring to FIG. 1, cliplet C(4) has a length T(4) and cliplet C(5) has a length T(5). Even though T(4) is less than T(5), cliplets C(4) and C(5) overlap in time. This temporal overlap can be seen in the fact that cliplets C(4) and C(5) share the video frames shown by reference numeral 110.

II. General Overview

Figure 2:
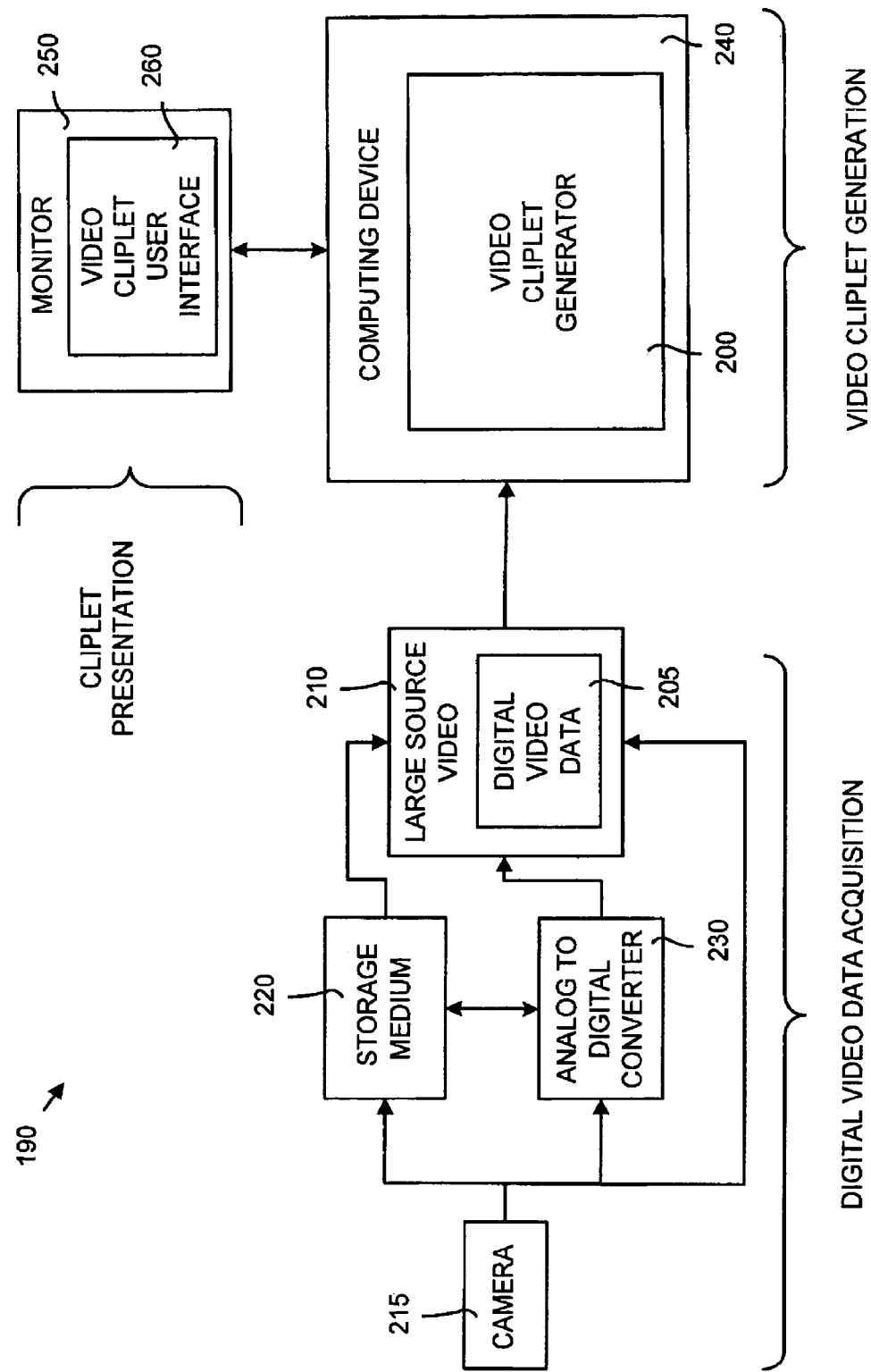
FIG. 2 is a block diagram illustrating an overview of an exemplary cliplet generation system incorporating the computer user interface system and method.

The computer user interface system and method of the present invention displays cliplets and information about the cliplets in an efficient and organized manner. Typically, the computer user interface system and method is part of a cliplet generation system for generating and presenting video cliplets. FIG. 2 is a block diagram illustrating an overview of an exemplary cliplet generation system 190 incorporating the computer user interface system and method. In general, as shown in FIG. 2, the system 190 includes a digital video data acquisition component, a video cliplet generation component, and a cliplet presentation component that includes the computer user interface system and method.

More specifically, digital video data acquisition concerns how a video cliplet generator 200 obtains digital video data 205. The digital video data 205 is contained in a large source video 210. Initially, a camera 215 is used to capture images of a scene (not shown). The camera 215 may be a digital or an analog video camera or a digital camera capable of capturing video data. If the camera 215 is a digital camera, captured video data is either stored in a storage medium 220 or sent directly to the video cliplet generator 200. If the camera 215 is an analog camera, the captured video data must be converted to digital form using an analog-to-digital converter 230. As before, this converted data may either be stored on the storage medium or sent directly to the video cliplet generator 200.

Once acquired, the large source video 210 containing the digital video data 205 is sent to the video cliplet generator 200. Typically, the large source video 210 is approximately a two-hour long home video captured by an amateur videographer. The video cliplet generator 200, which is located on a computing device 240, is used to extract small segments of video or cliplets from the large source video 210. After the cliplets are generated by the video cliplet generator 200, then a monitor (or other display device) 250 containing a video cliplet user interface 260 thereon is used to present each cliplet and information and properties about that cliplet to a user (not shown). Presentation and display is performed using the video cliplet user interface 260 (also called a computer user interface). The cliplet user interface 260 allows a user to obtain vital information about the cliplets and to manipulate, manage, and interact with the cliplets III. Exemplary Operating Environment The cliplet user interface 260 of the present invention is designed to operate in a computing environment. The follow discussion is intended to provide a brief, general description of a suitable computing environment in which the invention may be implemented.

Figure 3:
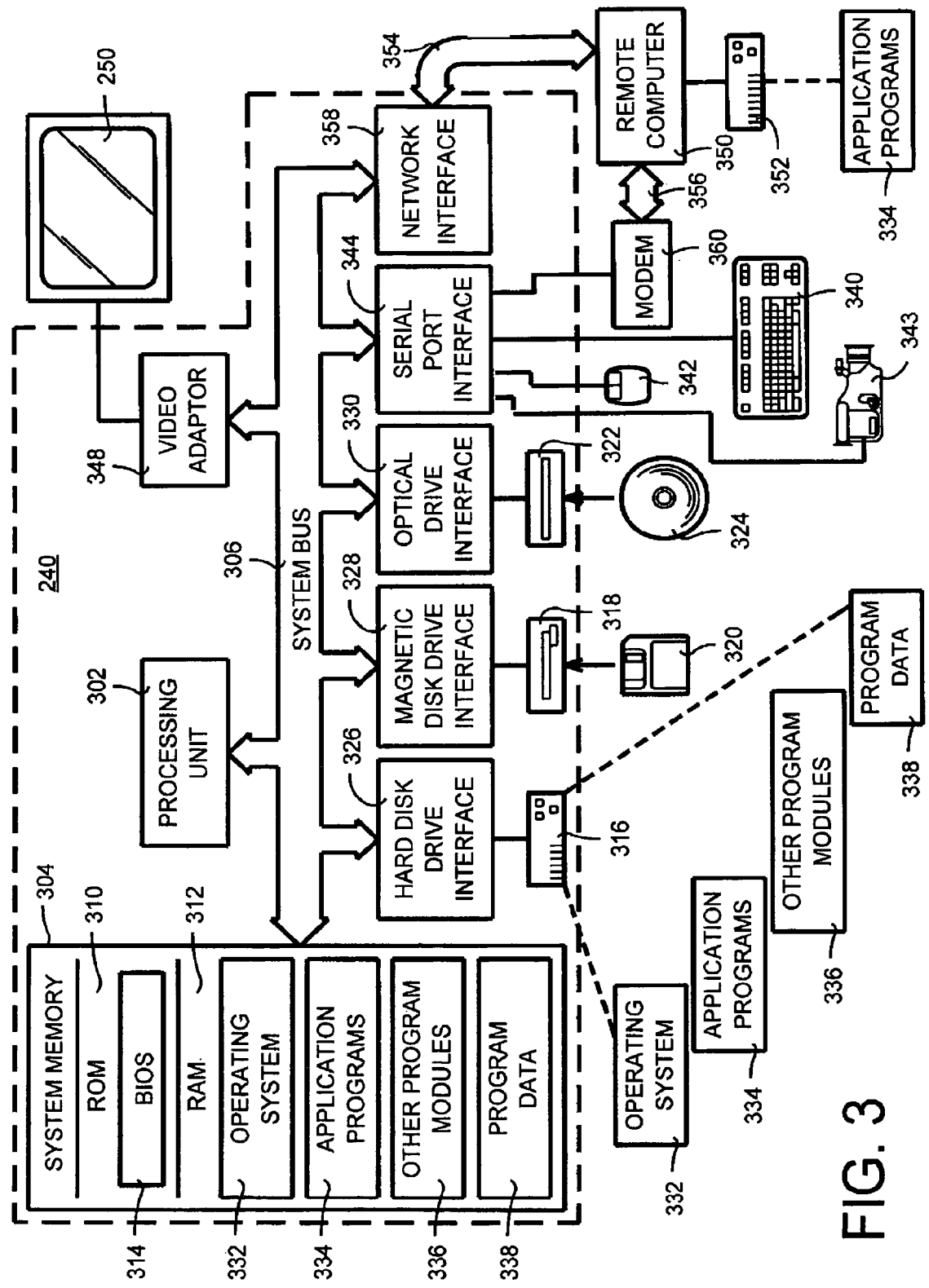
FIG. 3 is a block diagram illustrating a computing apparatus suitable for carrying out the invention.

FIG. 3 is a block diagram illustrating a computing apparatus suitable for carrying out the invention. Although not required, the invention will be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with a variety of computer system configurations, including personal computers, server computers, hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located on both local and remote computer storage media including memory storage devices.

With reference to FIG. 3, an exemplary system for implementing the invention includes a general-purpose computing device 240 shown in FIG. 2. FIG. 3 illustrates details of the computing device 240. In particular, the computing device 240 includes the processing unit 302, a system memory 304, and a system bus 306 that couples various system components including the system memory 304 to the processing unit 302. The system bus 306 may be any of several types of bus structures including a memory bus or memory controller, a peripheral bus, and a local bus using any of a variety of bus architectures. The system memory includes read only memory (ROM) 310 and random access memory (RAM) 312. A basic input/output system (BIOS) 314, containing the basic routines that help to transfer information between elements within the computing device 240, such as during start-up, is stored in ROM 310. The computing device 240 further includes a hard disk drive 316 for reading from and writing to a hard disk, not shown, a magnetic disk drive 318 for reading from or writing to a removable magnetic disk 320, and an optical disk drive 322 for reading from or writing to a removable optical disk 324 such as a CD-ROM or other optical media. The hard disk drive 316, magnetic disk drive 328 and optical disk drive 322 are connected to the system bus 306 by a hard disk drive interface 326, a magnetic disk drive interface 328 and an optical disk drive interface 330, respectively. The drives and their associated computer-readable media provide nonvolatile storage of computer readable instructions, data structures, program modules and other data for the computing device 240.

Although the exemplary environment described herein employs a hard disk, a removable magnetic disk 320 and a removable optical disk 324, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs), and the like, may also be used in the exemplary operating environment.

A number of program modules may be stored on the hard disk, magnetic disk 320, optical disk 324, ROM 310 or RAM 312, including an operating system 332, one or more application programs 334, other program modules 336 (such as the video cliplet generator 200) and program data 338. A user (not shown) may enter commands and information into the computing device 240 through input devices such as a keyboard 340 and a pointing device 342 (such as a mouse). In addition, a camera 343 (such as a video camera) may be connected to the computing device 240 as well as other input devices (not shown) including, for example, a microphone, joystick, game pad, satellite dish, scanner, or the like. These other input devices are often connected to the processing unit 302 through a serial port interface 344 that is coupled to the system bus 306, but may be connected by other interfaces, such as a parallel port, a game port or a universal serial bus (USB). The display device 250 is also connected to the system bus 306 via an interface, such as a video adapter 348. In addition to the display device 250, computing devices such as personal computers typically include other peripheral output devices (not shown), such as speakers and printers.

The computing device 240 may operate in a networked environment using logical connections to one or more remote computers, such as a remote computer 350. The remote computer 350 may be another personal computer, a server, a router, a network PC, a peer device or other common network node, and typically includes many or all of the elements described above relative to the computing device 240, although only a memory storage device 352 has been illustrated in FIG. 3. The logical connections depicted in FIG. 3 include a local area network (LAN) 354 and a wide area network (WAN) 356. Such networking environments are commonplace in offices, enterprise-wide computer networks, intranets and the Internet.

When used in a LAN networking environment, the computing device 240 is connected to the local network 354 through a network interface or adapter 358. When used in a WAN networking environment, the computing device 240 typically includes a modem 360 or other means for establishing communications over the wide area network 356, such as the Internet. The modem 360, which may be internal or external, is connected to the system bus 306 via the serial port interface 344. In a networked environment, program modules depicted relative to the computing device 240, or portions thereof, may be stored in the remote memory storage device 352. It will be appreciated that the network connections shown are exemplary and other means of establishing a communications link between the computers may be used.

IV. Video Cliplet User Interface

The cliplet user interface system and method of the present invention provides a user with much more information about a video than a traditional video editing software interfaces having only one or two views of the video. The cliplet user interface displays to a user a plurality of cliplets generated from a source video. This cliplet presentation provide much more information about a video than can be provided by only one or two views. With the cliplet user interface, in a single glance a user can determine from the plurality of cliplets the contents of the source video. In addition, using cliplets to describe the video is much more interesting to a user. This is because the cliplets presented to the user represent the most interesting portions of the video. Presenting a plurality of cliplets to a user also eliminates the need for manual scrubbing of the video. The cliplets are already cut from the source video using automatically determined editing points, and there is no need for the user to scrub the video to determine editing points.

The cliplet user interface also provides to a user information about each cliplet. For example, cliplet properties, such as cliplet interest ratings and usage statistics, can be presented to the user in a compact, informative manner through the cliplet user interface. Many properties make more sense on a per cliplet basis as opposed to per video basis. For example, the question, "where was the cliplet photographed?" makes more sense than "where was the video photographed?". This is because videos contain shots from multiple locations while cliplets generally contain a single event or theme.

Figure 4:
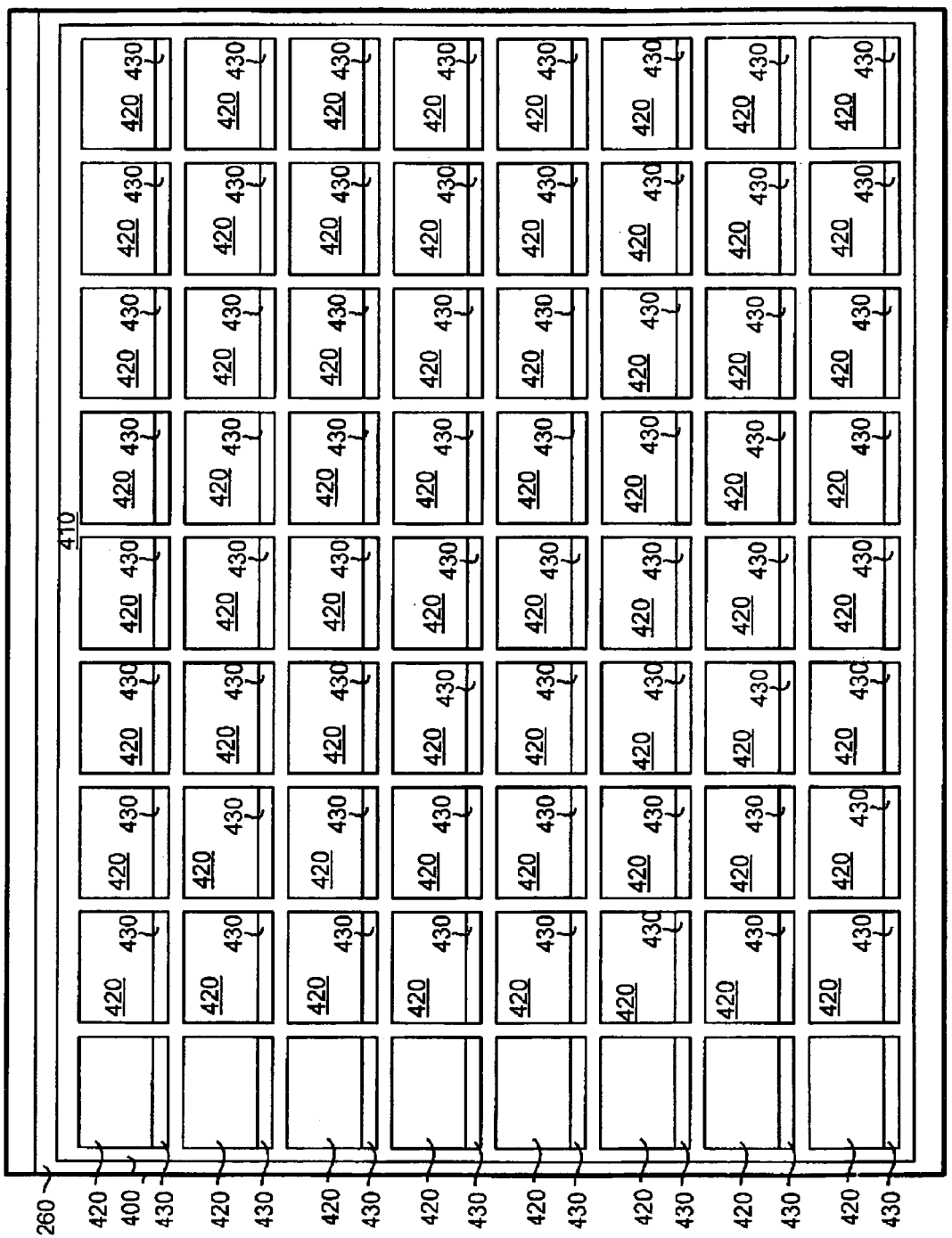
FIG. 4 illustrates a general overview of the cliplet user interface.

FIG. 4 illustrates a general overview of the cliplet user interface. In general, the cliplet user interface 260 is displayed on the display device 250 and includes a plurality of cliplets and information about each cliplet. In particular, the cliplet user interface 260 includes a cliplet presentation area 400 for displaying a plurality of cliplets 410 in a two-dimensional arrangement. Each of the plurality of cliplets 410 are displayed as a single, independent entity. This means that there is no stacking or piling of the cliplets within the cliplet presentation area 400. In addition, the plurality of cliplets may be arranged into visually-separate groups based on a cliplet property (including cliplet interest ratings) or any other form of metadata available for the plurality of cliplets. These visually-separate groups include visually-separate rows and visually-separate columns.

Each of the plurality of cliplets 410 is contained in a small keyframe window 420. The keyframe window 420 contains at least one keyframe that represents the cliplet, such as a thumbnail image. A cliplet property presentation area 430 is located within the keyframe window 420. In this view the cliplet property presentation area 430 is shown located at the bottom of the keyframe window 420. It should be noted that the cliplet property presentation area 430 may be located anywhere within or adjacent the keyframe window 420. The cliplet property presentation area 430 is for displaying at least one cliplet property in a compact fashion for each cliplet. The presentation of the cliplet property can be a graphical representation, a textual representation, or a combination of the two.

Presentation of cliplet properties in or adjacent to the keyframe window 420 allows a user to glean important information about the cliplet quickly and efficiently. For example, cliplet properties and information such as usage statistics, face detection, pan/zoom detection, and audio ratings may be displayed in the cliplet property presentation area 430 to provide a user with information about subject matter contained on the source video and whether cliplet content is interesting.

Figure 5:
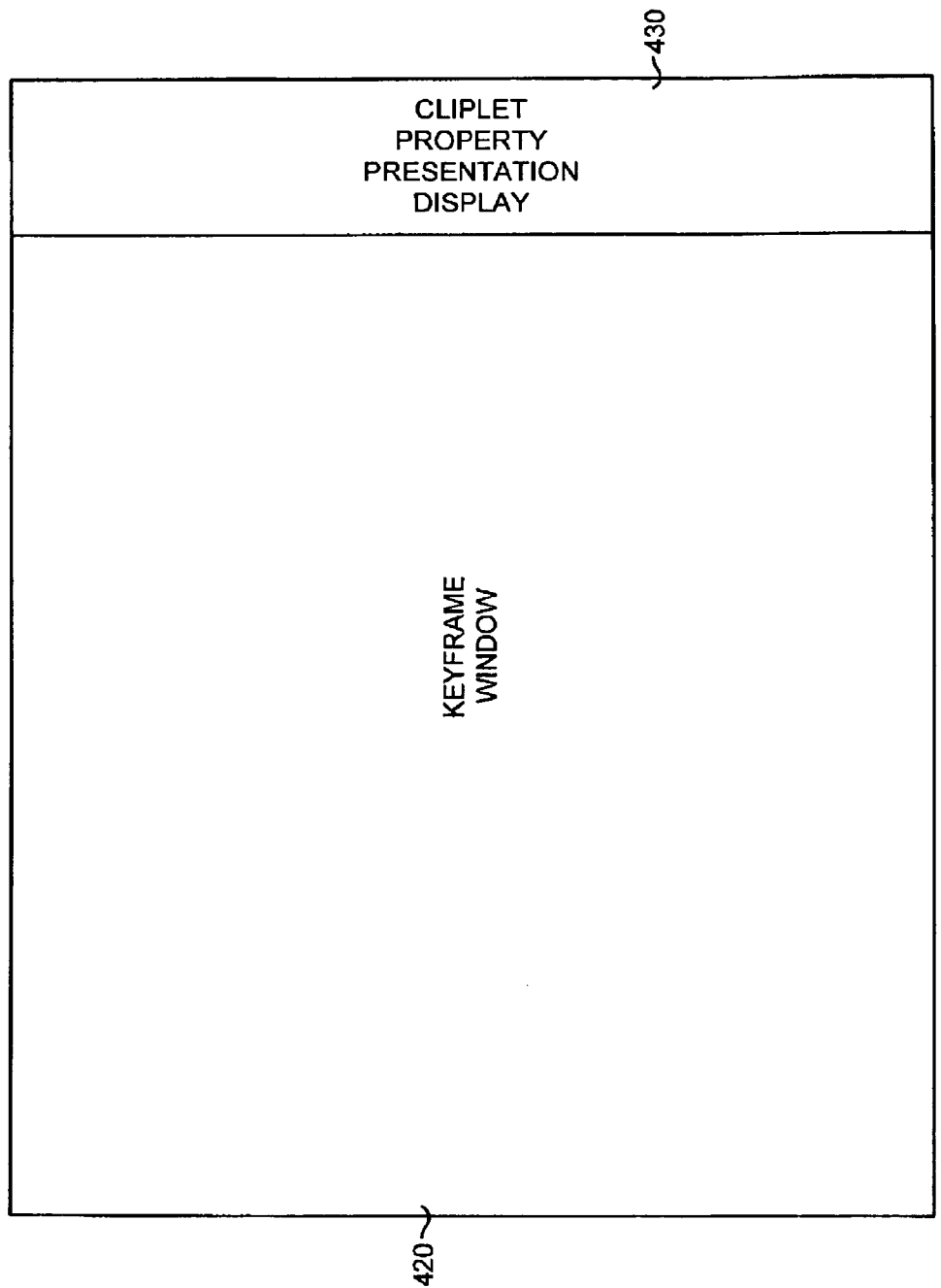
FIG. 5 illustrates a close-up view of the keyframe window of the cliplet user interface shown in FIG. 4.

FIG. 5 illustrates a close-up view of the keyframe window 420 shown in FIG. 4. The keyframe displayed in the keyframe window 420 represents the cliplet and may be a thumbnail image. In addition, a cliplets can be represented by a plurality of keyframes. In this situation, the cliplet may be represented in the keyframe window 420 in several ways. One way is to show each of a plurality of keyframes for a cliplet in successive or adjacent keyframe windows. Another way is for a user to use an input device (such as a mouse) to rotate through the plurality of keyframes. For example, the user could hold the mouse pointer over the keyframe window of the a cliplet and each of the plurality of keyframes would display in the keyframe window in a rotating manner. When the user found a desired keyframe, the user would click the mouse and the keyframe would be displayed in the keyframe window.

FIG. 5 also illustrates the cliplet property presentation area 430 located within the keyframe window 420. In this view, however, the cliplet property presentation area 430 is located on the right side of the keyframe window 420. A cliplet property is based on any cliplet information that is available. The cliplet properties are stored with the cliplet and can be displayed in the cliplet property presentation area 430. Cliplet properties includes cliplet interest ratings. These ratings provide visual cues about content in the cliplet that may be of interest to a user. For example, the cliplet interest rating displayed in the cliplet property presentation area 430 may show a user that the cliplet contains a face in almost every video frame. If the user was interested in cliplets having faces, this interest rating would indicate to the user that this cliplet would be of interest.

Cliplet interest ratings are unique to cliplets. Interest ratings do not really make sense for a long video. This is because the long video may contain two or more hours of video from multiple events. It becomes difficult, if not impossible, to assign a single interest rating to a plurality of events contained on the long video. On the other hand, cliplets are a semantically meaningful portion of the video that contains a single theme or event. Thus, assigning interest ratings to cliplets is natural and makes sense.

Figure 6:
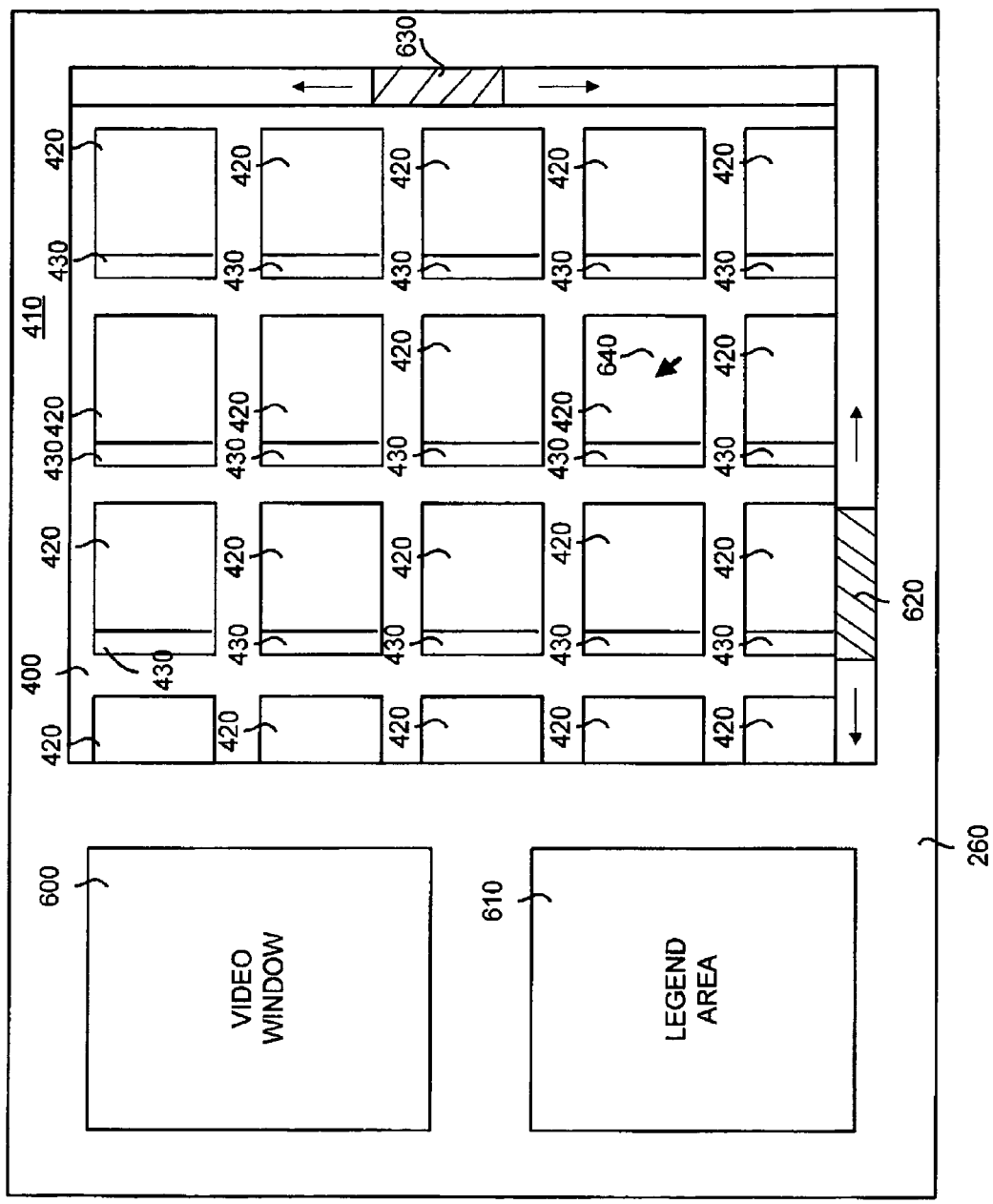
FIG. 6 illustrates another embodiment of the cliplet user interface.

FIG. 6 illustrates another embodiment of the cliplet user interface 260. In this embodiment, the cliplet user interface 260 contains additional areas including the cliplet presentation area 400, a video window 600 and a legend area 610. The cliplet presentation area 400 includes a plurality of cliplets 410 in a two-dimensional arrangement and displayed as a single, independent entities. Each of the plurality of cliplets 410 is contained in a small keyframe window 420. In this embodiment, the cliplet property presentation area 430 is located within the keyframe window 420 on the left side. The video window 600 is a window that generally is larger than the keyframe window 420 and allows a user to play a desired cliplet within the window 600. The legend area 610 contains information about the meaning of symbols used in the cliplet property presentation area 430.

The number of cliplets generated from a source video may number in the hundreds. To display each cliplet in the cliplet presentation area 400 would make each keyframe window 420 unreasonably small. The solution is to provide scrolling functionality in the cliplet presentation area 400 so that a user can scroll through each of the cliplets. As shown in FIG. 6, a horizontal scroll bar 620 and a vertical scroll bar 630 are provided for cliplet scrolling. The horizontal scroll bar 620 allows a user to scroll through each of the plurality of cliplets 410 in the horizontal direction across the cliplet presentation area 400. Similarly, the vertical scroll bar 630 allows a user to scroll through each of the plurality of cliplets 410 in the vertical direction.

The cliplet user interface 460 provides in-place preview functionality that allows a user to preview any cliplet in its own keyframe window 420. In other words, a user can use an input device to see cliplets play in the same space taken up by the keyframe. Thus, when directed by a user, the keyframe is replaced by the cliplet playing in the keyframe window 420. At the conclusion of the cliplet playing, the keyframe returns to the keyframe window 420.

The cliplet user interface 460 also provide drag and drop functionality such that at least one of the video cliplets can be placed into an application for processing. This drag and drop functionality allows a user to position a cursor 640 in the keyframe window 420 and drag and drop the desired cliplet into an application. For example, a user may want to drag and drop a cliplet into an authoring application that allows cutting and pasting of the cliplets. There is no need for the user to determine editing points because the cliplet is already cut from the source video.

Even though the starting and ending points (or editing points) of the cliplets already are determined, a user may be unsatisfied with them. The cliplet user interface allows a user to lengthen cliplets by merging a cliplet with its temporal neighbors. This is achieved by using an input device to merge at least two of the video cliplets such that a first cliplet merges with a second cliplet to create a new, third cliplet. The third cliplet is the duration of the first and second cliplets combined. This allows a user to lengthen and combine a cliplet with any of its temporal neighbors with requiring any scrubbing.

If the user is still unhappy with the editing points of a cliplets the cliplet user interface 460 includes functionality that allows a user to extend or shrink either the starting or the ending points. To avoid scrubbing, the user has the option of having the system automatically find one or two new editing points based on sub-shot boundaries (discussed below). Through the input device, the use can request that the cliplet user interface present other starting and ending point possibilities for the cliplet based on sub-shot boundaries previously determined.

V. Working Example

Figure 7:
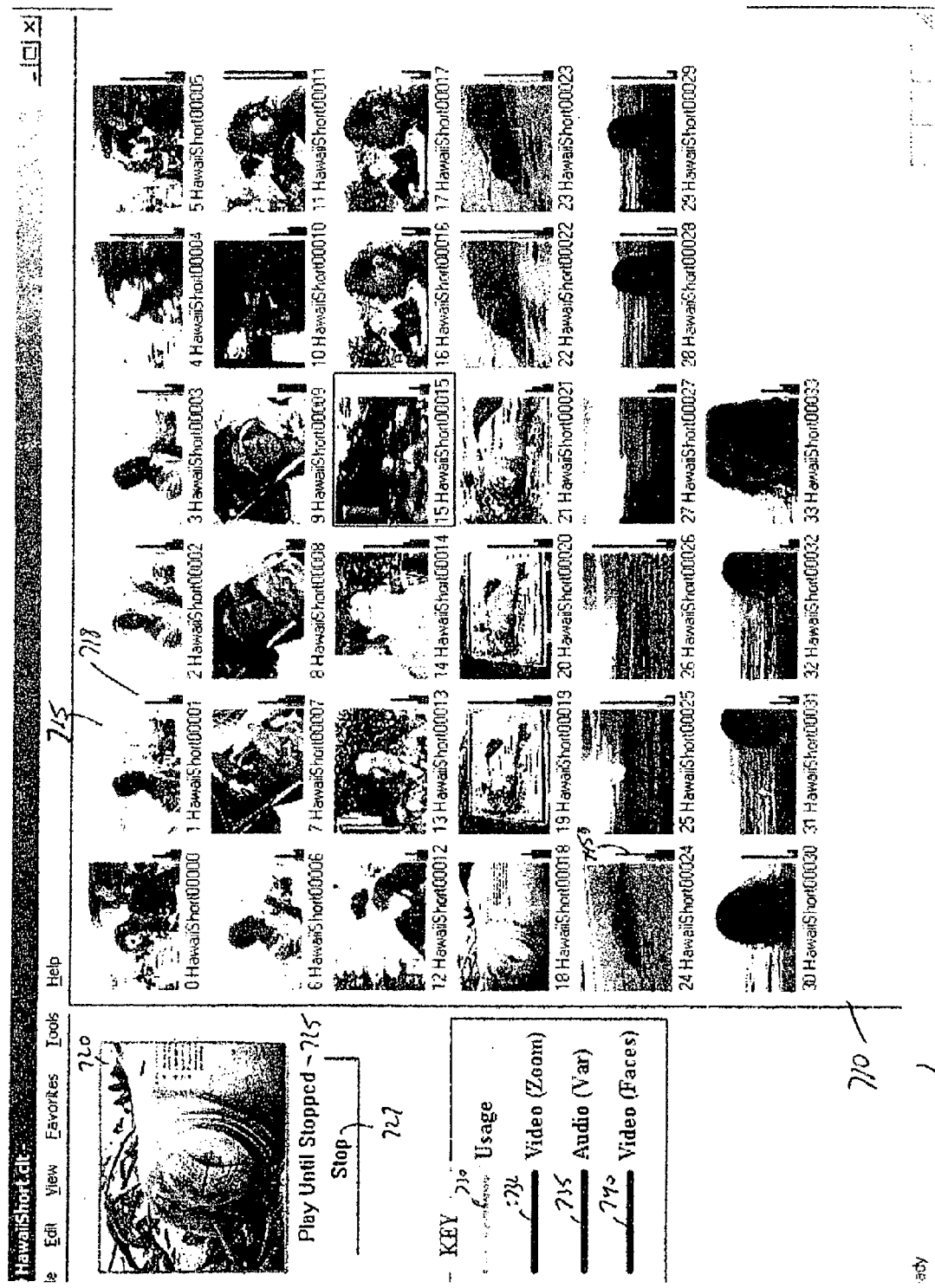
FIG. 7 is a working example of the cliplet user interface shown in FIG. 6.

FIG. 7 is a working example of the cliplet user interface 460 shown in FIG. 6. It should be noted that this is only one way in which the cliplet user interface 260 may be implemented. FIG. 7 includes a thumbnail user interface 700 that is an example of the cliplet user interface 260. The thumbnail user interface 700 includes a cliplet area 710 that is displaying thirty-four cliplets numbered #0 to #33. Each one of the cliplets is displayed in a thumbnail window 715, and each cliplet is represented by a thumbnail image in the thumbnail window 715. Adjacent to the thumbnail window 715 is a cliplet interest ratings area 718 that displays interest rating information as described below.

A cliplet video window 720 is used to play a desired cliplet. A "Play Until Stopped" feature 725 can be selected by a user to instruct the cliplet video window to play from the point shown in the window 720 (usually the keyframe or thumbnail representing the cliplet) until the end of the cliplet. A "Stop" feature 727 can be selected by a user to stop the cliplet from playing in the window 720. A key area 729 is used to displaying symbols and information to help a user understand the information being presented in the cliplet interest rating area 718.

Interest Ratings Bars

The cliplet interest ratings area 718 displays information about a corresponding cliplet to a user. In this working example, the cliplet interest ratings are displayed to a user in a graphical manner using interest bars. Other aspects of the invention include using any other type of indicator that displays and conveys information to the user about the cliplet interest ratings.

As shown in FIG. 7, the interest bars are arranged, from left to right, as a usage bar 730, a video (or zoom) bar 732, an audio bar 735, and a video (or faces) bar 740. The higher the bar the most of a property is present. For example, the higher the zoom bar 732 (corresponding to zoom) the more the cliplet is zoomed in. Similarly, the higher the audio bar 735 the more interesting the audio for that particular cliplet. Thus, if people in a cliplet are excited and shouting the audio bar 735 for that cliplet will be higher to indicate more interesting audio. The higher the video or faces bar 740, the more a face or faces is present in the cliplet. For example, as shown in FIG. 7, for the cliplet #24 the cliplet audio bar 745 is quite high compared to the other bars. This is because a Hawaiian monk seal was being photographed and there were excited shouts and cheers in the background of that cliplet. Interest ratings are convenient and effective ways to convey information to a user. For example, without having to open the video and search for the location in the video containing the monk seal, a use can immediately obtain a sense of that there is interesting audio content in cliplet #24.

It should be noted that interest rating bars are only one possible way of displaying cliplet properties and information. Cliplet properties can be illustrated and represented by any type of graphical or textual indicator. Typically, the indicator illustrates the cliplet property in relation to any other cliplet properties.

Usage Statistics

Cliplet properties includes usage statistics that track and display to a user the frequency of cliplet usage. This cliplet property is not computer during cliplet generation. Instead, usage statistics are computed as users are interacting with cliplet through the cliplet user interface.

As shown in FIG. 7, the usage bar 730 indicates how often the cliplet has been accessed. The usage bar 730 is displayed in the cliplet property presentation area 430. A lower usage bar means that the cliplet has not been accessed frequently. A higher usage bar indicates that the cliplet has been accessed frequently.

Each time a user views a cliplet the usage bar for that cliplet increases. Similarly, each time a user e-mails someone a cliplet, the usage bar for that cliplet increases. Through the usage bar 730 the user can obtain a visual idea of which cliplets are interesting to that particular user. Usage statistics are a type of cliplet interest rating that alleviates the need to explicitly ask the user to specify his favorite cliplets. There also can be a plurality of usage bars that are customized for several users. Thus, every user can know which cliplets are interesting to him and which cliplets that others found interesting. Over time usage statistics become more accurate in determining which cliplets are interesting to a user.

Usage statistics can be correlated with other cliplet properties, such as other interest ratings. This correlation can be used to adjust and train the interest ratings and the cliplet rating process over time based on the usage ratings and what is interesting to the user. By way of example, if a user is consistently looking at cliplets that have a lot of interesting audio, then it can be deduced that the audio interest ratings are important to the user. Thus, it can be determined that the user prefers and is interested in cliplets having high audio interest ratings. By correlating the usage statistics with the interest ratings, over time the cliplet user interface "learns" the preferences of the user. This knowledge can be used, for example, when creating a highlight video or determining which cliplets to present cliplets to the user.

Cliplet Generation and Interest Rating System Details

Figure 8:
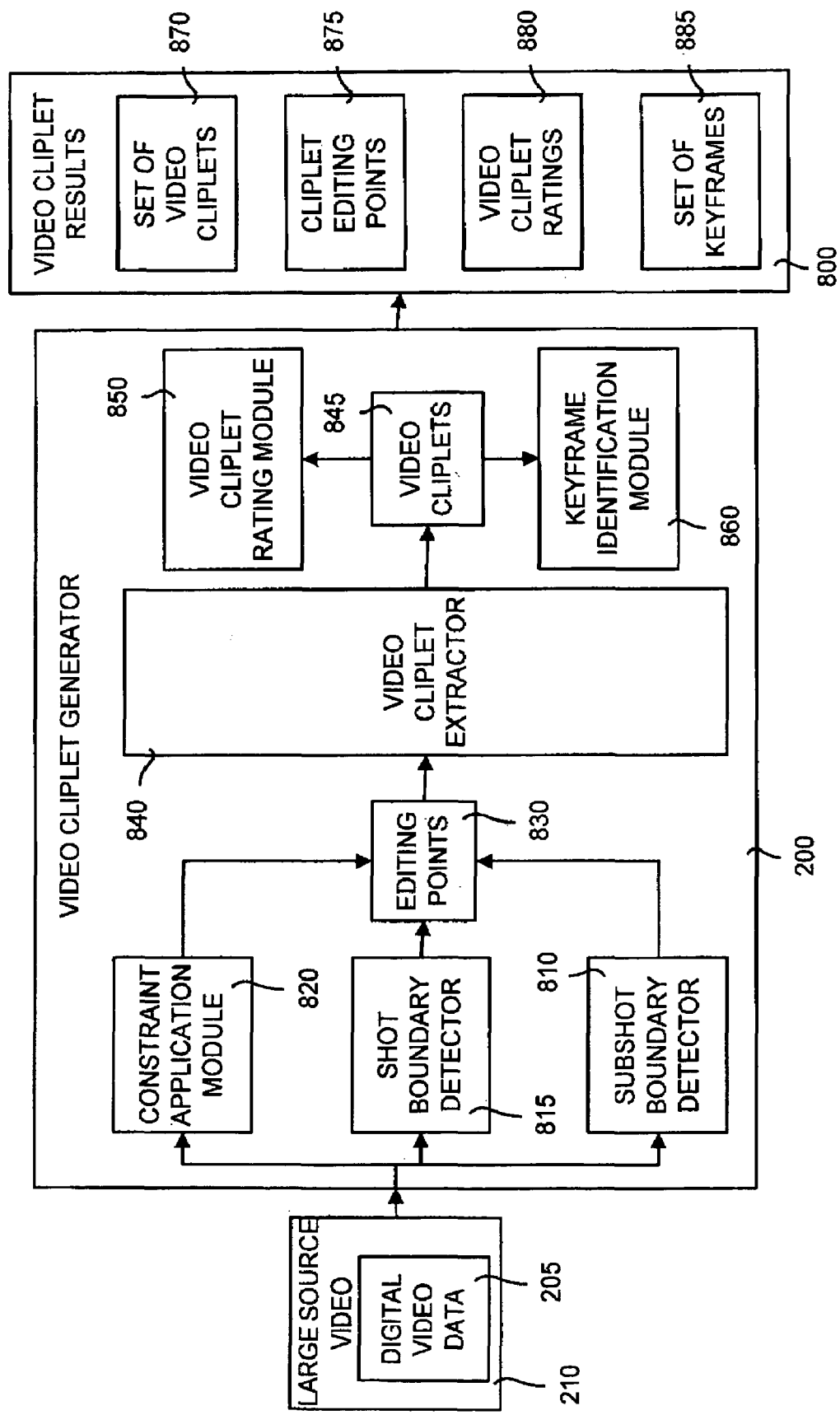
FIG. 8 is a detailed block diagram illustrating the details of the video cliplet generator shown in FIG. 2.

In this working example, the cliplet user interface 260 is implemented as part of the video cliplet generation system 190. This system 190 includes the video cliplet generator 200 for automatically generating cliplets and other cliplet information. FIG. 8 is a detailed block diagram illustrating the details of the video cliplet generator 200 shown in FIG. 2. In general, the video cliplet generator 200 inputs the large source 210 containing digital video data 205 and outputs cliplet information in the form of video cliplet results 800. The video cliplets results contains a variety of information relating to cliplets that can be presented to a user using the cliplet user interface 260.

The video cliplet generator 200 includes at least two modules to determine editing points: (1) a sub-shot boundary module 810 (an example of which is a shot boundary module 815; and (2) a constraint application module 820. The output for each of these modules 810, 815, 820 are editing points 830. The editing points 830 are cutting points or locations in the large source video 210 where a cliplet should be extracted. Each of the modules 810, 815, 820 may be used alone or in any combination to determine the editing points 830.

The sub-shot boundary detector 810 determines editing points 830 by finding sub-shots within the source video 210. Sub-shots are defined as semantic boundaries that define a specific event or theme. Sub-shot boundaries are not necessarily shot boundaries (see below), but they may be shot boundaries. For example, if a person is talking in the video, the pause between sentences may be a good place to define a sub-shot boundary, even though it is not a shot boundary. The sub-shot boundary detector 810 looks for places in the source video 210 where events or themes can be semantically separated, even within a single shot.

The shot boundary detector 815 determines the editing points 830 by processing the source video 210 to find shot boundaries—shot boundaries compose a subset of all of the sub-shot boundaries that may be detected by a particular cliplet generating system. A shot boundary is defined as the locations in the source video 210 where the camera has been turned "on" or "off". The portion of video between these camera "on" and camera "off" locations within the source video 210 is defined as a shot.

The constraint application module 820 determines the editing points 830 using a cliplet duration constraint. The cliplet duration constraint might indicate the minimum and maximum duration of a cliplet. Usually, the cliplet duration constraint is approximately between five and ten seconds, although other durations may be used. The cliplet duration constraint can be a "soft" constraint, meaning that if other constraints or editing point indicia are used, the cliplet duration constraint yields and allows the length of the cliplet to be arbitrarily long or short.

The constraint application module 820 takes the large source video 210 and divides the source video 210 into cliplets whose length adheres to the value of the cliplet duration constraint, while trying to cut cliplets at points where sub-shot boundaries have been detected. Appropriate measures are taken so that the complete set of generated cliplets satisfies the duration constraint. For example, if the constraint is a hard constraint that no cliplet be longer than 10 seconds, then a 36-second video, with sub-shots detected on the second, might generate 4 segments of video, (of 8, 7, 10, and 11 seconds length, or 4 overlapping segments of 10 seconds, etc.).

Once the editing points 830 have been determined, a video cliplet extractor 840 cuts cliplets from the source video 210 based on the editing points 830. Video cliplets 845 then are sent as output from the video cliplet extractor 840. Note that the cutting process may require no physical cutting at all, since the editing points together with a pointer to the source video themselves represent a cliplet.

The video cliplet generator 200 also includes a video cliplet ratings module 850 for generating an "interest rating" for each cliplet in the video cliplets 845. These ratings are computed per cliplet instead of per frame. The advantage of assigning ratings per cliplet is that each cliplet may be presented to a user based on these ratings. Because cliplets contain several frames, presenting all the cliplets and their ratings is a much more manageable task than presenting all frames and their ratings. In addition, a cliplet contains much more information than a frame, so presenting the most popular cliplets to a user allows the user to obtain much more information about the source video 210 that merely presenting the most popular frames.

A keyframe identification module 860 is included in the video cliplet generator 200 for determining a keyframe for a cliplet contained in the video cliplets 845. A keyframe is identified using criteria such that the keyframe best represents the selected criteria as applied to the cliplet. There may be any number of keyframes per cliplet, although at least one keyframe is preferred.

The output of the video cliplet generator 200 are video cliplet results 800. These results 800 can include cliplet information and cliplet properties generated by each of the modules contained in the video cliplet generator 200. As shown in FIG. 8, the video cliplet results 800 may include a set of video cliplets 870, obtained by the video cliplet extractor 840, and cliplet editing points 875 obtained one or more of the constraint application module 820, the shot boundary detector 815, and the sub-shot boundary detector 810. Moreover, the video cliplet results 800 also may include video cliplet ratings 880, obtained by the video cliplet rating module 850, and a set of keyframes 885, obtained by the keyframe identification module 860. The video cliplet results 800 may includes any combination of this cliplet information and properties.

Figure 9:
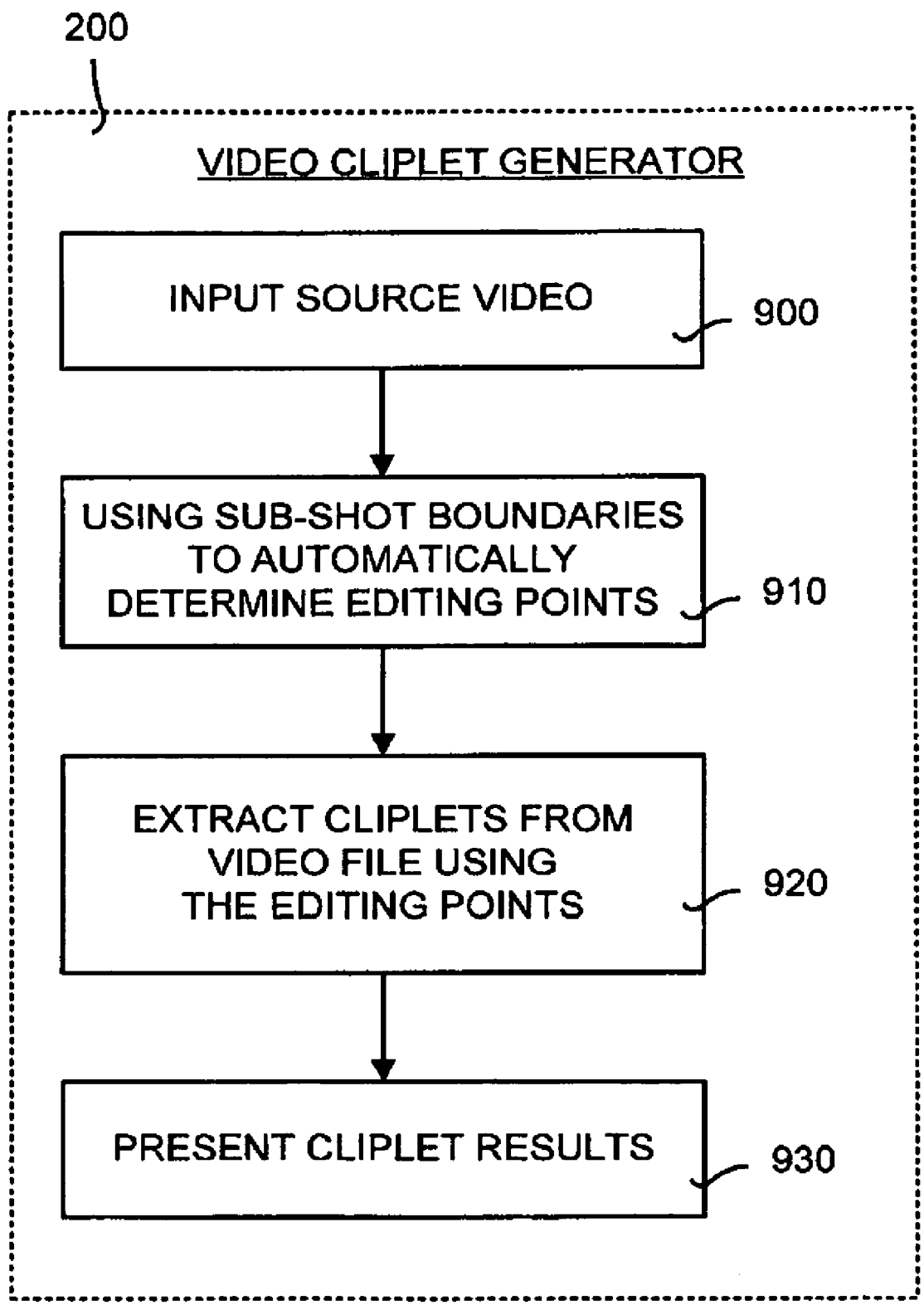
FIG. 9 is a general flow diagram illustrating the operation of the video cliplet generator shown in FIGS. 2 and 8.

FIG. 9 is a general flow diagram illustrating the operation of the video cliplet generator 200 shown in FIGS. 2 and 8. In general, the video cliplet generator 200 processes a large source video 210 to generate cliplets and cliplet information for presentation. Specifically, the video cliplet generator 200 first inputs the source video 210 for processing (box 900). Next, editing points 830 are automatically determined using sub-shot boundaries (box 910) and possibly one or more of the techniques discussed in detail below. Using the editing points 830, cliplets are extracted from the source video 210 (box 920). Finally, the cliplet results 800 are presented, such as to a user for manipulation.

Sub-Shot Boundary Detector

Figure 10:
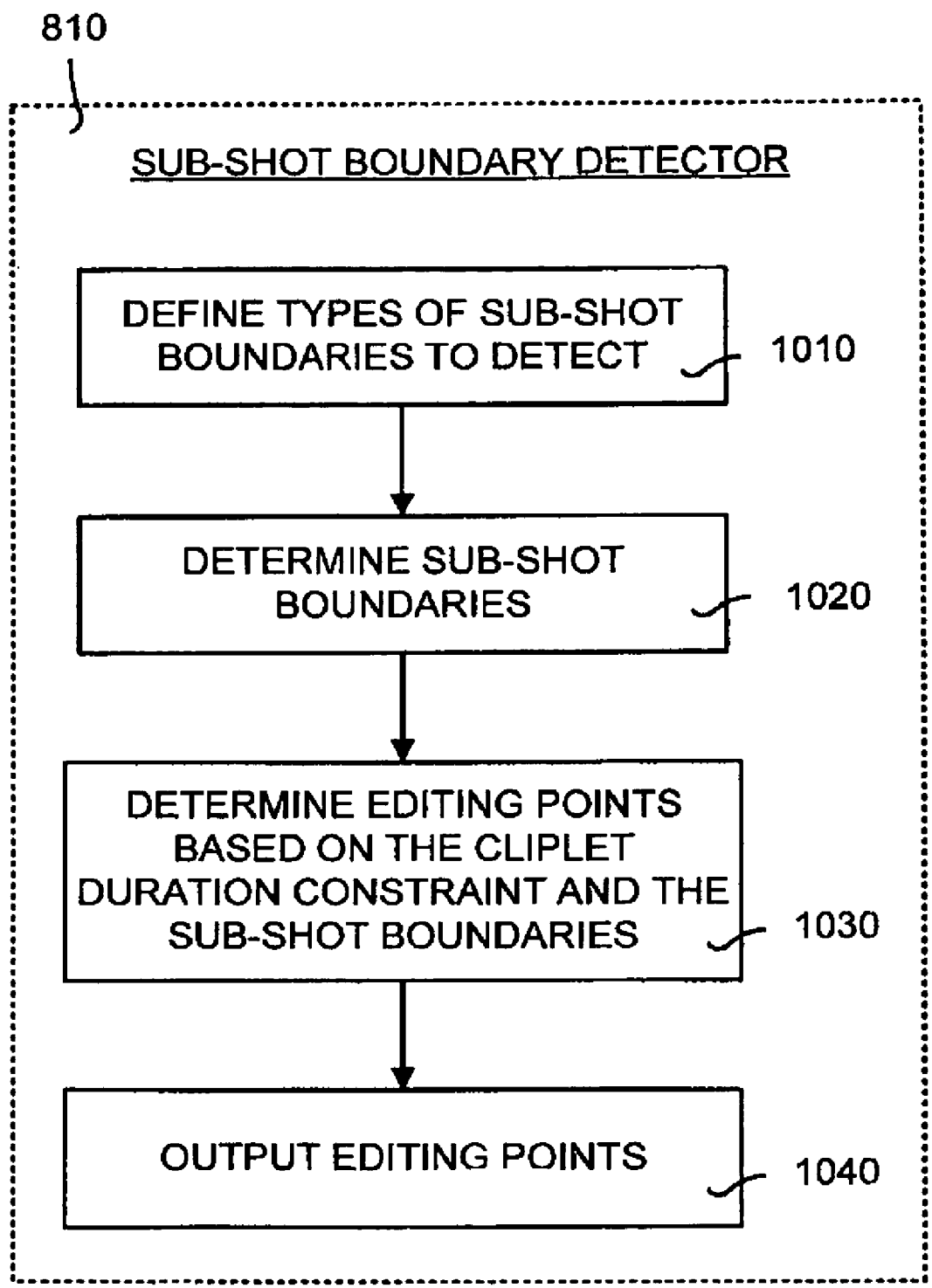
FIG. 10 is a detailed flow diagram illustrating the operational details of the sub-shot boundary detector shown in FIG. 8.

FIG. 10 is a detailed flow diagram illustrating the operational details of the sub-shot boundary detector 810 shown in FIG. 8. In general, the sub-shot boundary detector 810 uses sub-shot boundaries to define the editing points 830. The sub-shot boundary detection method is used to find the editing points 830 corresponding to those parts of the source video 210 that provide convenient points for cutting video and creating cliplets.

First, the types of sub-shot boundaries to detect are defined (box 1010). A sub-shot boundary may be defined using any type of criteria that semantically makes sense. For example, types of sub-shot boundaries include the following. Traditional shot boundaries are a type of sub-shot boundary. Any moment between speech utterances can be a sub-shot boundary. Panning may be used as a sub-shot boundary criteria, such that the beginning, middle or end of a pan (instead of at a steady point in the video) is used as a sub-shot boundary. Similarly, zoom may be used as a sub-shot boundary criteria, such that the point immediately following a zoom is used as a sub-shot boundary. Using a zoom criteria is based on the knowledge that a videographer will usually zoom in on an interesting subject or event. Scene clustering may be used as a sub-shot boundary criteria so that various scenes that are similar to each other are clustered together such that the similar scenes belong to the same sub-shot. In addition, time stamp-based shot detection, video-based shot detection, audio-based shot detection, and audio-visual based shot detection may be used as criteria for sub-shot boundary detection. Further, audio analysis using any available features in the audio signal portion of the source video 210 may be used to define sub-shot boundaries. These audio features include audio spectrum analysis, speech recognition, and audio power variance decomposition. Video analysis using any available features in the video signal of the source video 210 may be used to define sub-shot boundaries. These video features include color histograms, wavelet decomposition, optic flow parameters, Fourier transform coefficients, and face detection, to name a few.

Once the types of sub-shot boundaries are defined, the sub-shot boundaries are determined (box 1020). Next, the editing points 830 are determined based on the cliplet duration constraint and the sub-shot boundaries (box 1030). Finally, the editing points 830 are sent as output from the sub-shot boundary detector 810 (box 1040).

One example of finding sub-shot boundaries based on visual cues is to compute the Bhattacharya distance between the color histograms of adjacent video frames. It is assumed that peaks in the distance above a certain threshold are sub-shot boundaries. An alternative is to use "generative models of video" to model the source video 210 being processed and to define sub-shot boundaries when the background changes substantially. In addition, the sub-shot boundaries could be defined as the points when a certain visual element enters or exits the video. For example, sub-shot boundaries could be defined when a person enters or exits the scene. One example of finding sub-shot boundaries based on audio cues is to find valleys in the audio power signal that are longer than a fixed duration to determine moments of silence. The midpoints of the valleys could be defined as sub-shot boundaries. One example of finding a sub-shot boundaries without reference to any type of data is to create sub-shot boundaries every N seconds, where N may be a short duration such as the cliplet duration constraint. Any one or combination of the above-mentioned criteria could be used to defined sub-boundaries.

It should be noted that each editing point generated by sub-shot boundary detection will not necessarily be used to generate cliplets. This is because a sub-shot boundary is simply a candidate for cutting, not a definite editing point; thus, a resulting cliplet may itself contain many sub-shot boundaries. For example, a sub-shot boundary may be found every 0.5 seconds and the cliplet duration constraint may be 7 seconds. In this case, not every sub-shot boundary would be used because there are sub-shot boundaries too frequently.

Figure 11:
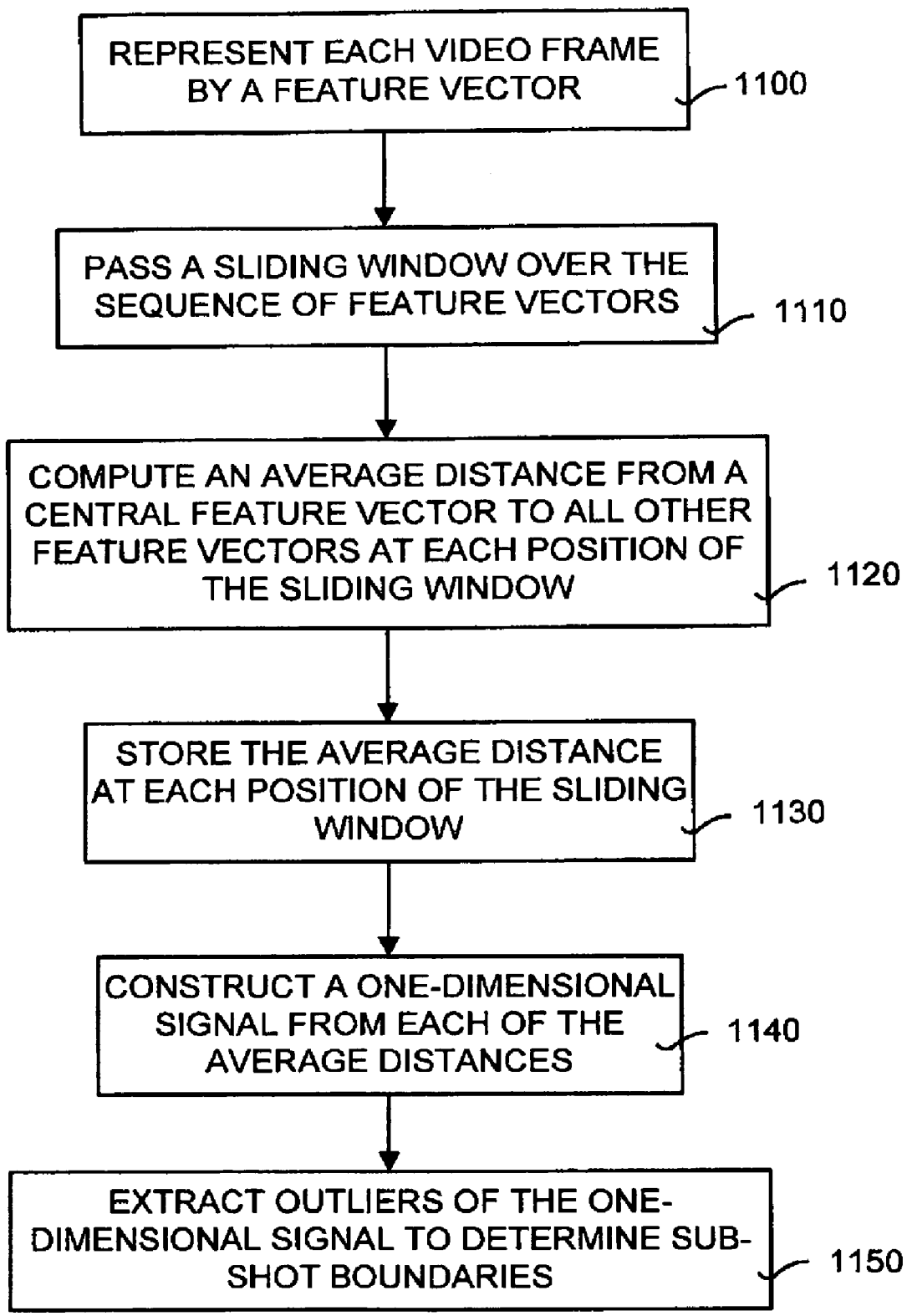
FIG. 11 is a detailed flow diagram illustrating a working example of the sub-shot detector using a feature-based approach.

FIG. 11 is a detailed flow diagram illustrating a working example of the sub-shot detector 820 using a feature-based approach. Using a feature-based approach means that each video frame in the video 210 was parsimoniously represented by a feature vector (box 1100). In this working example, the feature vector was a low-dimensional feature vector. The feature vectors are used throughout the sub-shot boundary detection process without any reference to the original video frames. Although the specific features may vary, the features used in this example were the average image luminance and the color histograms for each quarter of a video frame.

The sub-shot boundary detection was performed by passing a sliding window over the sequence of feature vectors (box 1110). At each position of the sliding window, the average distance from a central feature to all other feature vectors in the window was computed (box 1120) and were stored (box 1130). This resulted in a one-dimensional signal that was constructed from each of the stored average distances (box 1140). Next, the outliers of the one-dimensional signal were extracted (box 1150). The outliers of the one-dimensional signal correspond to sub-shot boundaries. The extraction was performed using a robust statistical outlier detection procedure.

Figure 12:
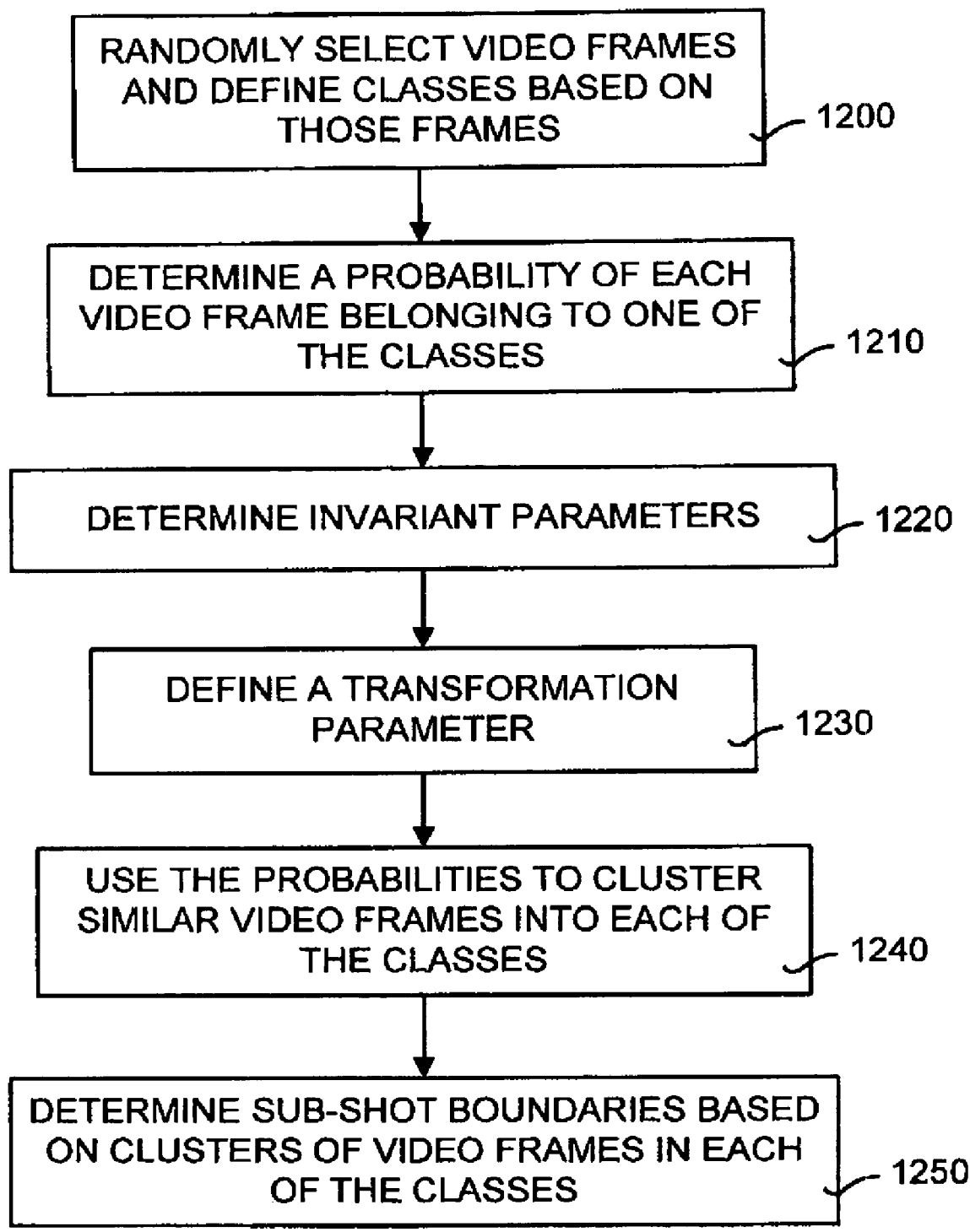
FIG. 12 is a detailed flow diagram illustrating a working example the sub-shot boundary detection using scene clustering.

FIG. 12 is a detailed flow diagram illustrating a working example the sub-shot boundary detection using scene clustering. The scene clustering is used to define and detect sub-shot boundaries and using these boundaries to generate cliplets. Scene clustering may be performed using video, audio, or both. The general idea is that similar data (whether visual or audio data) is clustered, and clusters of similar data are used to define classes. Each frame in the source video 210 is assigned to a class, and sub-shot boundaries occur where there is a change in class between frames.

The scene clustering method begins knowing neither the classes nor the class definitions (such as in terms of means and variances). Random guesses are made and through an iterative process the video frames begins clustering and aligning themselves into classes. Eventually, the video frames are grouped into separate classes and a mean image for the class becomes apparent.

As shown in FIG. 12, in this working example the scene clustering method begins by randomly selecting video frames from the source video 210 and defining classes based on these frames (box 1200). Next, for each video frame a probability that the video frame belongs to each of the classes was determined (box 1210). The observed data then was averaged and weighted by the probabilities, which made the video frames merge into separate, distinct classes. In addition, invariant parameters were determined (box 1220) and a transformation parameter was defined (box 1230). The transformation parameter is a random variable that transforms the video frame so that video frames that are similar but slightly transformed still belong to the same class. For example, if a set of video frames contain a person and the next set of video frames contains a close up of that same person, a zoom transformation parameter could be defined such that both sets of video frames belong to the same class regardless of the zoom. This is known as zoom invariant.

Typically, the data is clustered in a transformation invariant manner. This means that video frames that have similar content but are different because of shifting (such as left, right, up or down) or zoomed in or out are considered the same and clustered together in the same class. Alternatively, some transformation parameters can be selected as not invariant and used to determine scene clustering. In particular, if zoom is selected as an invariant zoom parameter, then sub-shot boundaries are not defined at zooming points. But if zoom is not an invariant transformation parameter, then a sub-shot boundary can be defined for a zooming point, such as after a zoom-in point on the source video 210.

The probabilities then were used to cluster similar video frames into each of the classes (box 1240). This was done using an iterative process so that through each iteration each video frames separated into distinct and separate classes. Finally, sub-shot boundaries were determined based on the clustering of the video frames into each of the classes (box 1250).

The scene clustering technique described above takes into account the spatial grouping of pixels with a video frame, and not just the color or intensity of the pixels. This give the scene clustering technique advantages over other techniques when determining sub-shot boundaries. For example, the scene clustering technique is much less sensitive to changes in intensity than pixel intensity techniques. This means that, unlike pixel intensity techniques, the scene clustering technique will not find a sub-shot boundary simply because of intensity changes between video frames. Moreover, the scene clustering technique is more reliable than pixel color techniques because color is a weak cue.

Shot Boundary Detector

Figure 13:
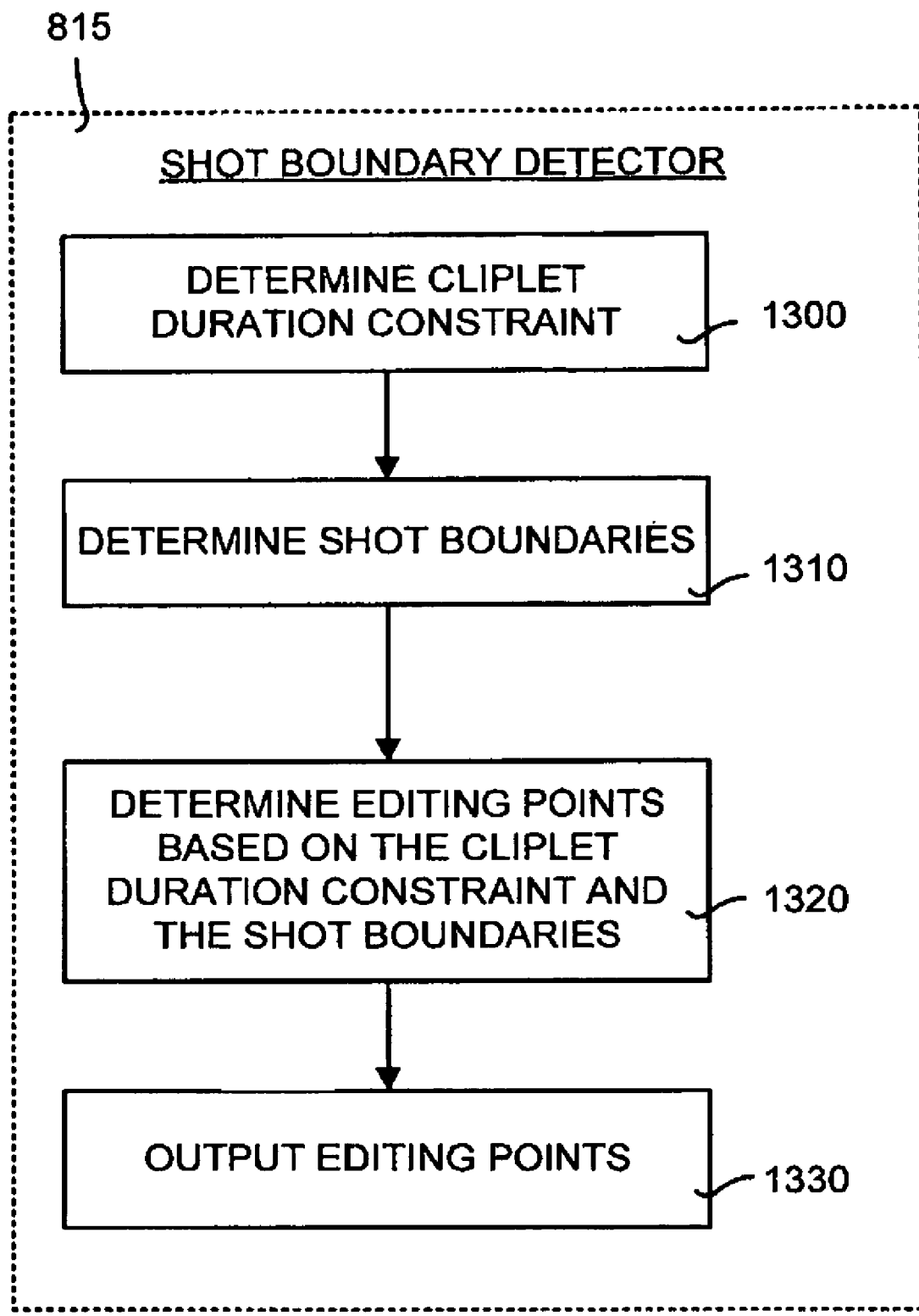
FIG. 13 is a detailed flow diagram illustrating the operational details of the shot boundary detector shown in FIG. 8.

FIG. 13 is a detailed flow diagram illustrating the operational details of the shot boundary detector 815 shown in FIG. 8. The shot boundary detector is an example, or typically one of the many components, of a sub-shot boundary detector. Generally, the shot boundary detector 815 finds the editing points 830 using discontinuities in the video time stamp, or in sudden discontinuities in the video image between adjacent frames. More specifically, the shot boundary detector 815 first determines the cliplet duration constraint (box 1300) in the manner described above. Next, shot boundaries are determined (box 1310). As discussed above, shot boundaries are those locations in the source video 210 where the camera has been turned "on" or "off". The portion of video between these camera "on" and camera "off" locations within the source video 210 is defined as a shot.

Constraint Application Module

Figure 14:
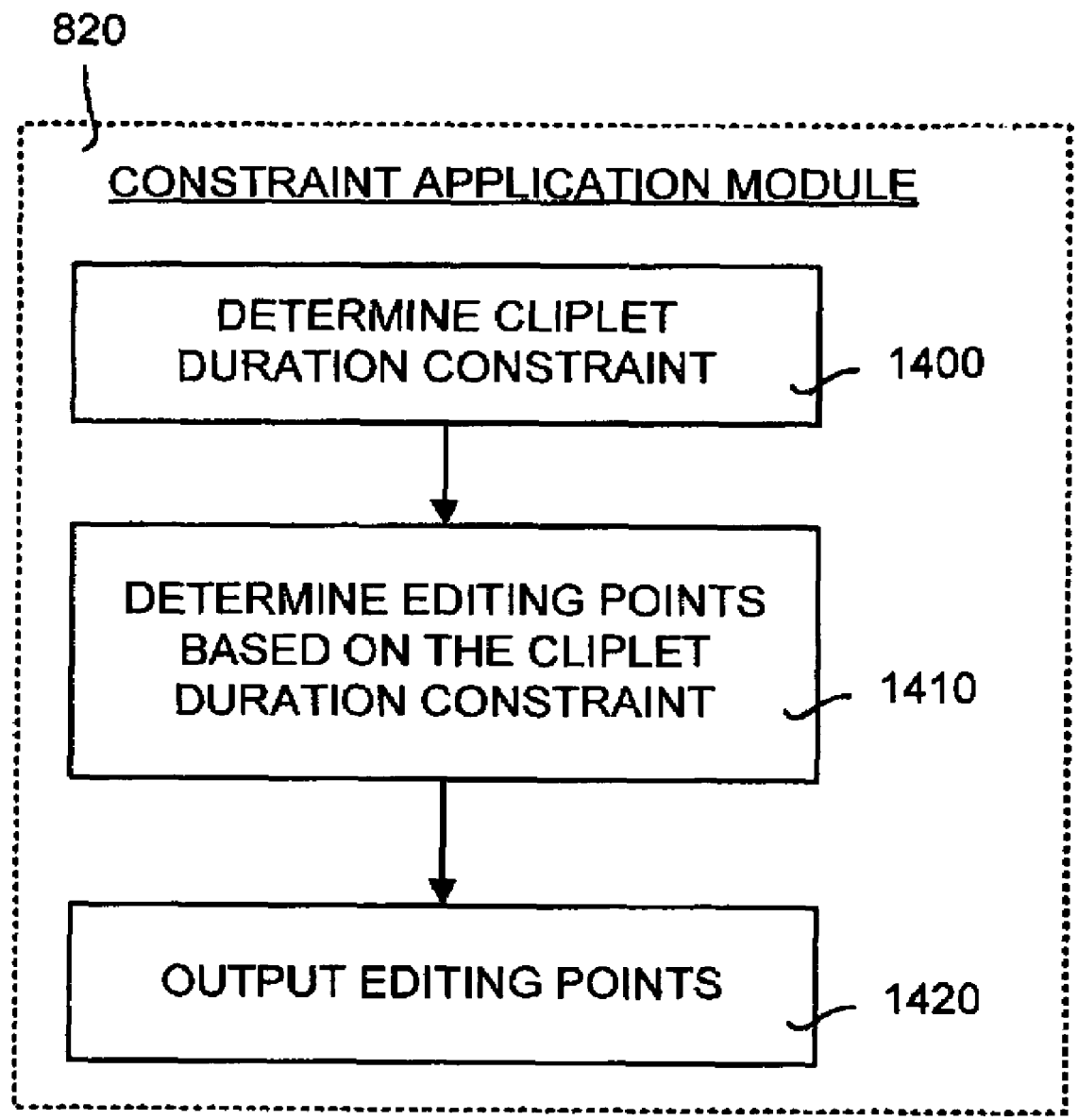
FIG. 14 is a detailed flow diagram illustrating the operational details of the constraint application module shown in FIG. 8.

FIG. 14 is a detailed flow diagram illustrating the operational details of the constraint application module 820 shown in FIG. 8. In general, the constraint application module 820 is used to find the editing points 830 to generate cliplets from the source video 210. In particular, a cliplet duration constraint is determined (box 1400). This constraints may be determined in a variety of ways, including being selected by a user, being pre-selected, or being determined on the fly by the constraint application module 820. As discussed above, the cliplet duration constraint can be any "hard" or "soft" constraint on the duration of a cliplet. In the event that no convenient sub-shot boundaries exist, the constraint application module 820 may arbitrarily make a cut, based on the duration constraint alone. Next, the editing points 830 are determined based on the cliplet duration constraint (box 1410). These editing points 830 then are sent as output from the constraint application module 820 (box 1420).

Video Cliplet Rating Module

Cliplets may have interest ratings assigned to them based upon processing technologies that are available to provide information about the cliplet. For example, if face detection technology is available, then each individual cliplet can be processed to detect faces. The information obtained from this processing, such as whether the cliplet contains a face, is then stored with each individual cliplet. Based on this information an interest rating in face detection then can be determined for each cliplet. The interest ratings are computed per cliplet, rather than per video frame.

Figure 15:
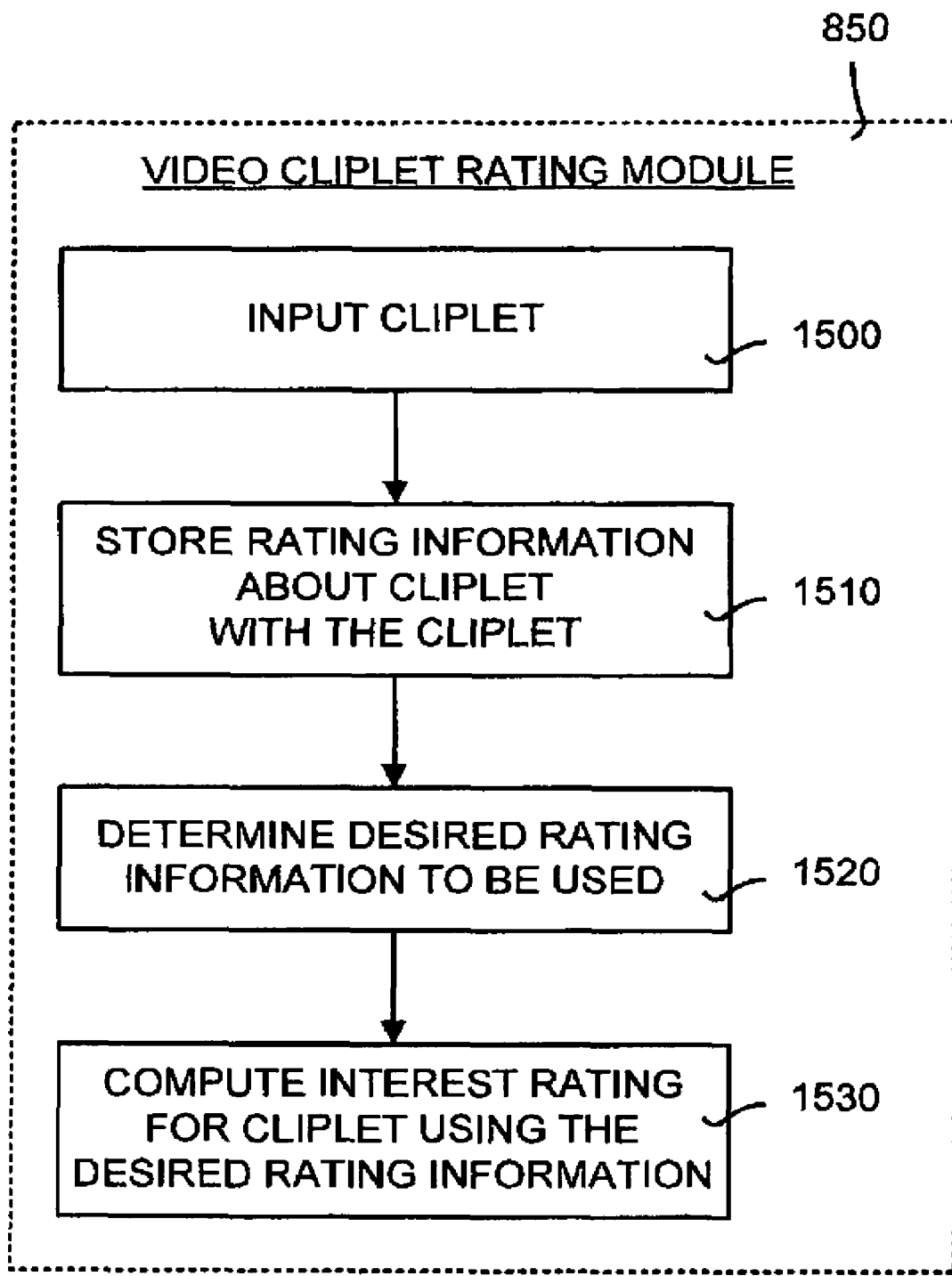
FIG. 15 is a detailed flow diagram illustrating the operational details of the video cliplet rating module shown in FIG. 8.

FIG. 15 is a detailed flow diagram illustrating the operational details of the video cliplet rating module 850 shown in FIG. 8. The video cliplet rating module 850 assigns cliplet interest ratings to individual cliplets. As shown in FIG. 15, the video cliplet rating module 850 begins by inputting a cliplet (box 1500). Next, interest rating information about the cliplet is stored with the cliplet (box 1510). The desired rating information to be used then is determined (box 1520). The desired rating information means which of the rating information stored with the cliplet is to be used when assigning cliplet ratings. Finally, the video cliplet rating module 850 computes an interest rating for the cliplet using the desired rating information (box 1530). Preferably, the interest rating for each cliplet is normalized over all of the cliplets. For example, a cliplet having the highest interest rating in face detection would be normalized to a value equal to one, and all other interest ratings in face detection for other cliplets would be one or less.

Cliplet interest ratings can be based on any information relevant to and available for a cliplet. This cliplet rating information includes time stamps, location stamps, audio signal, video signal and all of the information and analyses as discussed above concerning sub-shot boundary detection. Cliplet rating information can take advantage of whatever technology is available to provide information about a cliplet. This includes voice recognition, speaker recognition, face detection, zoom detection, pan detection, any type of audio analyses or recognition, and any type of video analyses or recognition. Any of these technologies may be used to generate an interest rating for an individual cliplet. By way of example, is the interest rating is in detecting faces, then cliplets containing faces would have a higher interest rating than those cliplet without faces. As another example, if the interest rating is in close-ups, then cliplets that immediately follow a zooming event would have a higher interest rating than other cliplets.

Cliplet interest ratings may be multi-dimensional. For example, a cliplet may have a rating for "audio activity level" as well as separate ratings for "visual activity level" and "occurrence of faces". Ratings may be absolute numeric values or may be relative orderings (or rankings) between cliplets. The video cliplet rating module 850 can compute ratings for cliplets individually or for a set of all possible cliplets.

By way of example, assume that a rating is to be assigned to a cliplet based on audio. This can be performed by computing a variance in an audio power signal, normalized over all known cliplets. In another example of cliplet rating using vision, assume that camera zoom or pan is detected and higher ratings are assigned to cliplets immediately following a zoom or pan event. In yet another example of cliplet rating using duration is to make a rating proportional to a Gaussian centered on durations of x seconds, where x might be based on user preferences or expectations.

Keyframe Identification Module

At least one keyframe can be identified for each cliplet. A keyframe is a representative video frame of a cliplet that best summarizes the content of the cliplet. There may be any number of keyframes per cliplet, although at least one keyframe is preferred.

Figure 16:
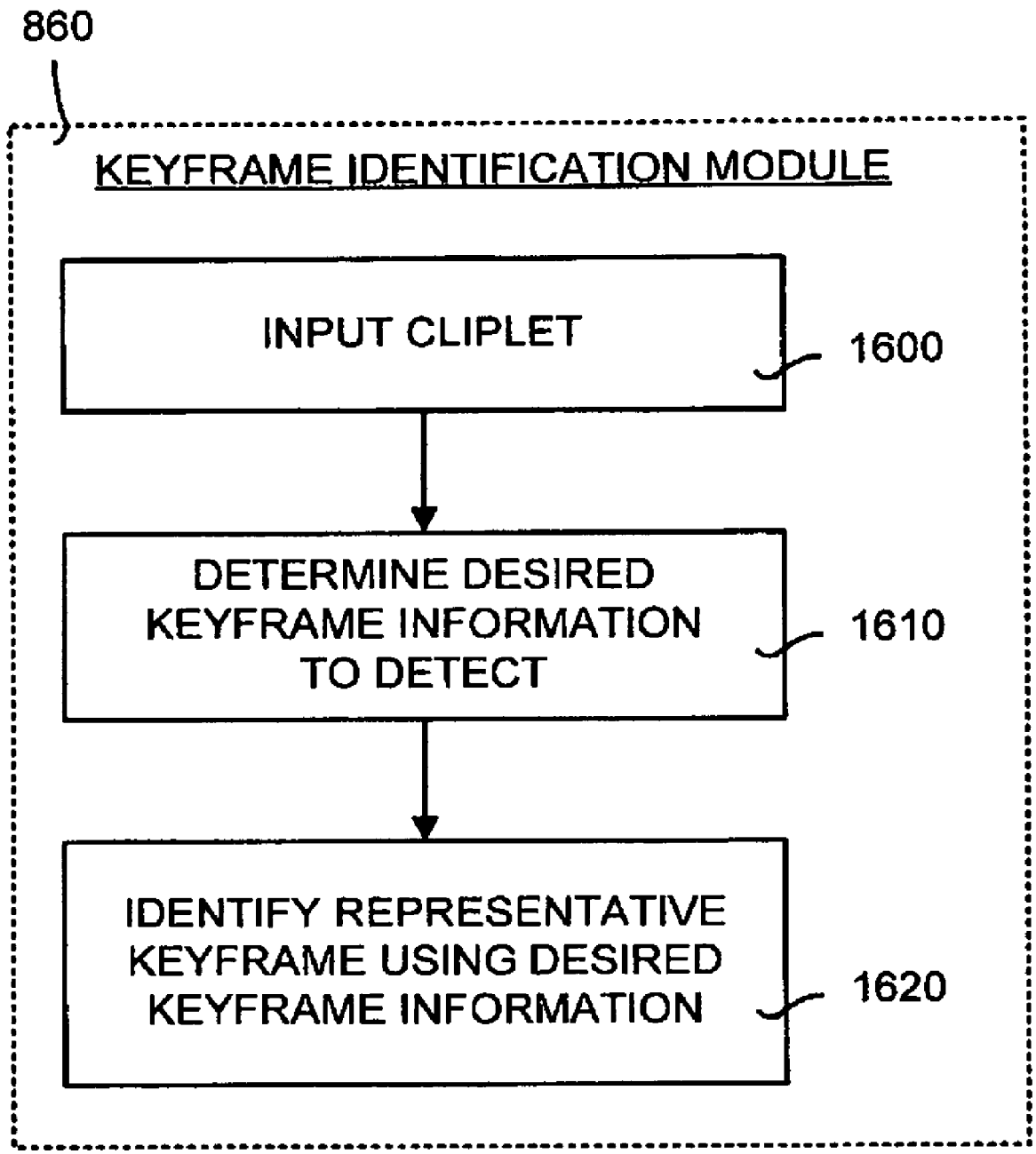
FIG. 16 is a detailed flow diagram illustrating the operational details of the keyframe identification module shown in FIG. 8.

FIG. 16 is a detailed flow diagram illustrating the operational details of the keyframe identification module 860 shown in FIG. 8. Initially, the keyframe identification module 860 receives a cliplet as input (box 1600). The desired keyframe information to detect is then determined (box 1610). Lastly, an representative keyframe is identified using the desired keyframe information (box 1620).

The information used to detect a keyframe can be information obtained from any of the processing techniques described above, such as audio analyses and recognition and video analyses and recognition. Alternatively, a keyframe may be detected without reference to information contained within the cliplet. For example, keyframes may be identified for each individual cliplet by detecting the middle video frame of a cliplet and defining that middle video frame as the keyframe. Another example of keyframe identification is to sample every $m^{th}$ video frame of the cliplet and define those sampled video frames as keyframes. Yet another example of keyframe identification is to run a Viterbi algorithm on the Bhattacharya distance on color histograms of video frames in the cliplet. The location of peaks in the computer log-likelihood are defined as keyframes for the cliplet.

The goal of identifying keyframes is to extract the most representative video frames from an individual cliplet in order to summarize that cliplet. To achieve this goal, the keyframes identified should be maximally dissimilar and have a high utility value. A frame distance metric and a frame utility measure are defined. The frame distance metric measures the similarity between two video frames contained in the cliplet. The frame distance metric is zero for identical video frames and increase in value for an increase in frame dissimilarity. The frame utility measure reflects the goodness of a video frame as a keyframe. Typically, video frames that are brighter (meaning higher average luminance) and are more colorful (meaning higher entropy on color histograms) are preferred as keyframes. In a preferred approach to keyframe identification, keyframes are identified by a dynamic programming (or Viterbi) procedure maximizes a cost function. The cost function encapsulates the desired criteria or desired keyframe information to detect. In addition, an optimal number of keyframes for each cliplet is automatically determined using the Bayes Information Criterion (BIC).

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. In a computer system having a user interface including a display device and an input device, a method for displaying short segments of video called video cliplets generated from a digital source video, comprising:

extracting a first set of video cliplets from the digital source video by determining sub-shot boundaries to define a first set of editing points in the source video every N seconds without reference to any type of data, wherein the first set of video cliplets are extracted based on the first set of editing points such that one editing point is a starting point of a video cliplet and another editing point is an ending point of the video cliplet;

displaying the first set of video cliplets on the display device in a two-dimensional arrangement with each of the first set of video cliplets displayed as a single, independent entity without displaying piles or stacks of clipets;

extracting a second set of video cliplets by determining sub-shot boundaries using camera zoom criteria to define a second set of editing points in the digital source video such that a first editing point immediately following a first camera zoom in the source video is a starting point of a first video cliplet and a second editing point immediately following a second camera zoom in the source video is an ending point of the first video cliplet;

determining that a user is unsatisfied with at least one of the starting point and the ending point of the first video cliplet;

merging the first video cliplet with a second video cliplet, the first and the second video cliplets being temporal neighbors, to generate a third video cliplet that is a duration of the first and second video cliplets combined;

displaying a keyframe of a cliplet of the first set and the second set of cliplets in a keyframe window, such that the keyframe is a still frame of the cliplet that represents the cliplet;

previewing the cliplet in the keyframe window, as directed by the user, such that the keyframe is replaced by the cliplet playing in the keyframe window and at the conclusion of the cliplet playing the keyframe returns to the keyframe window; and displaying a cliplet property for each of the plurality of video cliplets to provide the user with information about a corresponding cliplet.

2. The method as set forth in claim 1, wherein each of the first set and second set of video cliplets is displayed in its own keyframe window.

3. The method as set forth in claim 2, further comprising displaying interest ratings in the keyframe window, 4. The method as set forth in claim 2, wherein the keyframe window is a thumbnail.

5. The method as set forth in claim 1, wherein each of the first set and second set of video cliplets is represented by a keyframe.

6. The method as set forth in claim 1, further comprising representing each of the first set and second set of video cliplets by a plurality of keyframes.

7. The method as set forth in claim 6, further comprising allowing the user to use an input device to rotate through the plurality of keyframes to select a desired keyframe to represent an associated video cliplet.

8. The method as set forth in claim 6, further comprising displaying simultaneously at least two of the plurality of keyframes from a same cliplet.

9. The method as set forth in claim 1, wherein the cliplet property is a cliplet interest rating that is based on any available cliplet information.

10. The method as set forth in claim 1, further comprising organizing the first set and second set of cliplets into visually-separate groups based on at least one of: (a) the cliplet property; (b) any other form of metadata available for the first set and second set of cliplets.

11. The method as set forth in claim 1, further comprising organizing the first set and second set of cliplets into visually-separate rows based on at least one of: (a) the cliplet property; (b) any other form of metadata available for the first set and second set of cliplets.

12. The method as set forth in claim 1, further comprising organizing the first set and second set of cliplets into visually-separate columns based on at least one of: (a) the cliplet property; (b) any other form of metadata available for the first set and second set of cliplets.

13. A method in a computer system for displaying on a display device video cliplets generated from a source video, comprising:

generating the video cliplets such that at least some of the video cliplets overlap in time and any two different video cliplets can contain some identical video frames;

determining sub-shot boundaries using camera zoom criteria to define editing points in the source video such that a first editing point immediately following a first camera zoom in the source video is a starting point of a first video cliplet and a second editing point immediately following a second camera zoom in the source video is an ending point of the first video cliplet;

determining that the user is unsatisfied with at least one of the starting point and the ending point of the first video cliplet; * merging the first video cliplet with a second video cliplet, the first and the second video cliplets being temporal neighbors, to generate a third video cliplet that is a duration of the first and second video cliplets combined;

dividing the display area on the display device into a plurality of windows;

displaying each of the video cliplets in each of the plurality of windows as a single, independent entity without displaying piles or stacks of cliplets; and displaying a video cliplet rating for each of the video cliplets.

14. The method as set forth in claim 13, further comprising arranging the plurality of windows in a two-dimensional arrangement.

15. The method as set forth in claim 13, further comprising displaying the video cliplet rating as at least one of the following: (a) a graphical representation; (b) a textual representation.

16. The method as set forth in claim 15, wherein the graphical representation is interest rating bars.

17. The method as set forth in claim 13, further comprising allowing a user to use an input device to scroll the display area and reveal additional windows containing cliplets.

18. The method as set forth in claim 13, further comprising providing drag and drop functionality such that at least one of the video cliplets can be dragged and dropped into an application for processing.

19. The method as set forth in claim 13, further comprising allowing a user to use an input device to merge at least two of the video cliplets such that a first one of the video cliplets merges with a second one of the video cliplets to create a new video cliplet.

20. The method as set forth in claim 19, wherein the first and second ones of the video cliplets are temporal neighbors.

* * * * *